(12) United States Patent
Nakamura et al.

(10) Patent No.: US 12,542,613 B2
(45) Date of Patent: Feb. 3, 2026

(54) SIGNAL PROCESSING APPARATUS, SIGNAL PROCESSING METHOD AND COMMUNICATION SYSTEM

(71) Applicant: NTT, Inc., Tokyo (JP)

(72) Inventors: Masanori Nakamura, Musashino (JP); Takayuki Kobayashi, Musashino (JP); Yoshiaki Kisaka, Musashino (JP); Yutaka Miyamoto, Musashino (JP)

(73) Assignee: NTT, Inc., Tokyo (JP)

( * ) Notice: Subject to any disclaimer, the term of this patent is extended or adjusted under 35 U.S.C. 154(b) by 225 days.

(21) Appl. No.: 18/565,433

(22) PCT Filed: Jun. 8, 2021

(86) PCT No.: PCT/JP2021/021747
§ 371 (c)(1),
(2) Date: Nov. 29, 2023

(87) PCT Pub. No.: WO2022/259367
PCT Pub. Date: Dec. 15, 2022

(65) Prior Publication Data
US 2024/0267129 A1 Aug. 8, 2024

(51) Int. Cl.
*H04B 10/06* (2006.01)
*H04B 10/61* (2013.01)

(52) U.S. Cl.
CPC ....... *H04B 10/6161* (2013.01); *H04B 10/613* (2013.01)

(58) Field of Classification Search
CPC .............. H04B 10/6161; H04B 10/613; H04B 10/6165; H04B 10/6164; H04B 10/516;
(Continued)

(56) References Cited

U.S. PATENT DOCUMENTS 8,472,814 B2 * 6/2013 Zhang ................ H04B 10/6161
398/208
2015/0372766 A1 * 12/2015 Yoshida .................. H04B 10/61
398/208
(Continued)

FOREIGN PATENT DOCUMENTS

JP 6319487 B1 5/2018
JP 2020141294 A 9/2020

OTHER PUBLICATIONS

Takayuki Kobayashi, et al., "35-Tb/s C-band Transmission over 800 km Employing 1-Tb/s PS-64QAM signals enhanced by Complex 8 X 2 MIMO Equalizer", Optical Fiber Communication Conference Postdeadline Papers 2019, Th4B.2.
(Continued)

*Primary Examiner* — Hanh Phan

(57) ABSTRACT

A receiver convolves an impulse response for compensating for frequency characteristics and a complex impulse response for wavelength dispersion compensation with each of a real component and an imaginary component of each polarized wave of a reception signal. For each polarized wave, the receiver performs complex signal processing of multiplying the imaginary component by the imaginary unit, then branching the resulting component, and adding one imaginary component to the real component. For each polarized wave, the receiver uses, as input signals, the real component and the imaginary component of each polarized wave after complex signal processing and the phase conjugates of them. For each polarized wave, the receiver adds a signal obtained by a process in which each of the real component and the imaginary component of each polarized wave is multiplied by a complex impulse response, the resulting components are added, and a phase rotation is applied and a signal obtained by a process in which each of the phase conjugate of the real component and the phase
(Continued)

conjugate of the imaginary component of each polarized wave is multiplied by a complex impulse response, the resulting components are added, and an opposite phase rotation is applied, and adds a transmission data bias correction signal.

6 Claims, 20 Drawing Sheets

(58) Field of Classification Search
CPC .............. H04B 10/616; H04B 10/6166; H04B 10/532; H04B 10/548; H04B 10/6162; H04B 10/6163; H04B 10/2507; H04B 10/40; H04B 10/0795; H04J 14/06
USPC ....... 398/202, 203, 204, 205, 206, 207, 208, 398/209, 135, 136, 183, 184, 188, 158, 398/159, 65, 152, 79, 213, 214, 33, 38, 398/25, 26, 27
See application file for complete search history.

(56) References Cited

U.S. PATENT DOCUMENTS

| | | |
|---|---|---|
| 2020/0036440 A1 | 1/2020 | Yamagishi et al. |
| 2022/0149974 A1 | 5/2022 | Kobayashi et al. |
| 2024/0405874 A1* | 12/2024 | Sato .................. H04B 10/2513 |

OTHER PUBLICATIONS

Pierluigi Poggiolini, et al., "Analytical and Experimental Results on System Maximum Reach Increase Through Symbol Rate Optimization", Journal of Lightwave Technology, vol. 34, No. 8, 1872-1885, 2016.

Rafael Rios-Muller, et al., "Blind Receiver Skew Compensation and Estimation for Long-Haul Non-Dispersion Managed Systems Using Adaptive Equalizer", Jounal of Lightwave Technology, vol. 33, No. 7, Apr. 1, 2015, p. 1315-1318.

C.R.S. Fludger, et al., "Transmitter Impairment Mitigation and Monitoring for High Baud-Rate, High Order Modulation Systems", 42nd European Conference and Exhibition on Optical Communications, Sep. 18-22, 2016.

John J. Shynk, "Frequency-Domain and Multirate Adaptive Filtering", IEEE SP Magazine, Jan. 1992.

Manabu Arikawa et al., "Transmitter and receiver impairment monitoring using adaptive multi-layer linear and widely linear filter coefficients controlled by stochastic gradient descent", Optics Express vol. 29, No. 8, Apr. 12, 2021, pp. 11548-11561.

Akira Kawai et al., "4-Dimensional IQ Characteristic Estimation for Polarization-multiplexed Coherent Transceivers", OFC 2022, 2022.

* cited by examiner

FIG. 17

| | SC1 | SC2 | SC3 | SC4 | SC5 | SC6 | SC7 | SC8 |
|---|---|---|---|---|---|---|---|---|
| X-POLARIZED WAVE | 20.19 | 21.91 | 22.98 | 24.23 | 24.53 | 23.40 | 21.81 | 18.62 |
| Y-POLARIZED WAVE | 18.67 | 22.10 | 23.49 | 25.05 | 24.81 | 23.02 | 21.97 | 19.88 |

FIG. 18

| | SC1 | SC2 | SC3 | SC4 | SC5 | SC6 | SC7 | SC8 |
|---|---|---|---|---|---|---|---|---|
| X-POLARIZED WAVE | 20.84 | 22.13 | 23.40 | 24.63 | 24.55 | 23.38 | 22.10 | 20.47 |
| Y-POLARIZED WAVE | 20.26 | 22.28 | 23.71 | 24.93 | 24.77 | 23.48 | 22.08 | 20.46 |

SIGNAL PROCESSING APPARATUS, SIGNAL PROCESSING METHOD AND COMMUNICATION SYSTEM

CROSS-REFERENCE TO RELATED APPLICATIONS

This application is a 371 U.S. National Phase of International Application No. PCT/JP2021/021747, filed on Jun. 8, 2021. The entire disclosure of the above application is incorporated herein by reference.

TECHNICAL FIELD

The present invention relates to a signal processing method, a signal processing apparatus, and a communication system.

BACKGROUND ART

In digital coherent transmission, it is required not only to compensate for waveform distortion occurring in an optical fiber transmission line but also to adaptively compensate for device imperfection in an optical transceiver. Thus, there is a technology of collectively compensating for device imperfections in a transmitter and a receiver (see, for example, Patent Literature 1 and Non Patent Literature 1). On the other hand, these days, subcarrier modulation technology is drawing attention (see, for example, Non Patent Literature 2).

CITATION LIST

Patent Literature

Patent Literature 1: JP 2020-141294 A

Non Patent Literature

Non Patent Literature 1: Takayuki Kobayashi, et. al., "35-Tb/s C-Band Transmission Over 800 km Employing 1-Tb/s PS-64 QAM Signals Enhanced by Complex 8×2 MIMO Equalizer," Optical Fiber Communication Conference Postdeadline Papers 2019, Th4B.2

Non Patent Literature 2: Pierluigi Poggiolini, et. al., "Analytical and Experimental Results on System Maximum Reach Increase Through Symbol Rate Optimization," Journal of Lightwave Technology, VOL. 34, NO. 8, 1872-1885, 2016

SUMMARY OF INVENTION

Technical Problem

Adaptive equalization circuits of Patent Literature 1 and Non Patent Literature 1 are different in configuration from a 2×2 MIMO (multiple-input, multiple-output) adaptive equalization circuit of complex number input and complex number output generally used in conventional optical communication. In the adaptive equalization circuits of Patent Literature 1 and Non Patent Literature 1, generated tap coefficients, etc. have no commonality or compatibility, and the total number of taps increases. Therefore, the tap convergence and the circuit scale may be doubled. Further, if subcarrier signals subcarrier-modulated by the technology of Non Patent Literature 2 are collectively received and the technologies of Patent Literature 1 and Non Patent Literature 1 are used to demodulate the reception signals, there is a case where the device imperfections in the transmitter and the receiver cannot be collectively compensated for.

In view of the above circumstances, an object of the present invention is to provide a signal processing method, a signal processing apparatus and a communication system that perform equalization processing with good accuracy while suppressing increases in tap convergence and circuit scale.

Solution to Problem

A signal processing method of an aspect of the present invention includes: a first compensation step of convolving an impulse response for compensating for a frequency characteristic of a receiver and a complex impulse response for wavelength dispersion compensation with each of a real component and an imaginary component of each polarized wave of a polarization-multiplexed reception signal; a complex signal processing step of, for each polarized wave, performing imaginary unit multiplication processing of multiplying the imaginary component subjected to convolution by an imaginary unit and then performing complex signal processing that is any of processing of branching the imaginary component multiplied by the imaginary unit and adding one of the branched imaginary components to the real component subjected to convolution, processing of branching the real component subjected to convolution and adding one of the branched real components to the imaginary component multiplied by the imaginary unit, and processing of branching each of the real component subjected to convolution and the imaginary component multiplied by the imaginary unit, adding one of the branched imaginary components to one of the branched real components, and subtracting another of the branched imaginary components from another of the branched real components; an input signal generation step of, for each polarized wave, generating, as input signals, the real component and the imaginary component of each polarized wave after the complex signal processing and phase conjugates of the real component and the imaginary component of each polarized wave after the complex signal processing; an equalization step of, for each polarized wave, generating a first addition signal obtained by a process in which each of the real component and the imaginary component of each polarized wave included in the input signals is multiplied by a complex impulse response, then resulting components are added, and further a phase rotation for frequency offset compensation is applied and a second addition signal obtained by a process in which each of the phase conjugate of the real component and the phase conjugate of the imaginary component of each polarized wave included in the input signals is multiplied by a complex impulse response, then resulting components are added, and further a phase rotation opposite to the phase rotation for frequency offset compensation is applied; and a second compensation step of, for each polarized wave, adding or subtracting a transmission data bias correction signal to or from a signal obtained by adding the first addition signal and the second addition signal.

A signal processing method of an aspect of the present invention includes: a subcarrier separation step of separating, for subcarriers, each of a real component and an imaginary component of each polarized wave of a polarization-multiplexed reception signal and, for each subcarrier of each polarized wave, performing imaginary unit multiplication processing of multiplying the imaginary component by an imaginary unit and then performing complex signal processing that is any of processing of branching the imaginary component multiplied by the imaginary unit and adding one of the branched imaginary components to the real component, processing of branching the real component and adding one of the branched real components to the imaginary component multiplied by the imaginary unit, and processing of branching each of the real component subjected to convolution and the imaginary component multiplied by the imaginary unit, adding one of the branched imaginary components to one of the branched real components, and subtracting another of the branched imaginary components from another of the branched real components; an input signal generation step of, for each subcarrier of each polarized wave, generating, as input signals, the real component and the imaginary component of each polarized wave after the complex signal processing of the subcarrier and phase conjugates of the real component and the imaginary component of each polarized wave after the complex signal processing of a symmetric subcarrier that is another subcarrier in a frequency domain symmetric to a frequency domain of the foregoing subcarrier across a center frequency of the reception signal; an equalization step of, for each subcarrier of each polarized wave, generating a first addition signal obtained by a process in which each of the real component and the imaginary component of each polarized wave of the subcarrier included in the input signals is multiplied by a complex impulse response, then resulting components are added, and further a phase rotation for frequency offset compensation is applied and a second addition signal obtained by a process in which each of the phase conjugate of the real component and the phase conjugate of the imaginary component of each polarized wave of the symmetric subcarrier included in the input signals is multiplied by a complex impulse response, then resulting components are added, and further a phase rotation opposite to the phase rotation for frequency offset compensation is applied; and a compensation step of, for each subcarrier of each polarized wave, adding or subtracting a transmission data bias correction signal to or from a signal obtained by adding the first addition signal and the second addition signal.

A signal processing apparatus of an aspect of the present invention includes: a first compensation section (hereinafter also referred to as "a first compensator generator") that convolves an impulse response for compensating for a frequency characteristic of a receiver and a complex impulse response for wavelength dispersion compensation with each of a real component and an imaginary component of each polarized wave of a polarization-multiplexed reception signal; a complex signal processing section (hereinafter also referred to as "a complex signal processor") that, for each polarized wave, performs imaginary unit multiplication processing of multiplying the imaginary component subjected to convolution by an imaginary unit and then performs complex signal processing that is any of processing of branching the imaginary component multiplied by the imaginary unit and adding one of the branched imaginary components to the real component subjected to convolution, processing of branching the real component subjected to convolution and adding one of the branched real components to the imaginary component multiplied by the imaginary unit, and processing of branching each of the real component subjected to convolution and the imaginary component multiplied by the imaginary unit, adding one of the branched imaginary components to one of the branched real components, and subtracting another of the branched imaginary components from another of the branched real components; an input signal generation section (hereinafter also referred to as "an input signal generator") that, for each polarized wave, generates, as input signals, the real component and the imaginary component of each polarized wave after the complex signal processing and phase conjugates of the real component and the imaginary component of each polarized wave after the complex signal processing; an equalization section (hereinafter also referred to as "an equalizer") that, for each polarized wave, generates a first addition signal obtained by a process in which each of the real component and the imaginary component of each polarized wave included in the input signals is multiplied by a complex impulse response, then resulting components are added, and further a phase rotation for frequency offset compensation is applied and a second addition signal obtained by a process in which each of the phase conjugate of the real component and the phase conjugate of the imaginary component of each polarized wave included in the input signals is multiplied by a complex impulse response, then resulting components are added, and further a phase rotation opposite to the phase rotation for frequency offset compensation is applied; and a second compensation section (hereinafter also referred to as "a second compensator") that, for each polarized wave, adds or subtracts a transmission data bias correction signal to or from a signal obtained by adding the first addition signal and the second addition signal.

A signal processing apparatus of an aspect of the present invention includes: a subcarrier separation section that separates, for subcarriers, each of a real component and an imaginary component of each polarized wave of a polarization-multiplexed reception signal and, for each subcarrier of each polarized wave, performs imaginary unit multiplication processing of multiplying the imaginary component by an imaginary unit and then performs complex signal processing that is any of processing of branching the imaginary component multiplied by the imaginary unit and adding one of the branched imaginary components to the real component, processing of branching the real component and adding one of the branched real components to the imaginary component multiplied by the imaginary unit, and processing of branching each of the real component subjected to convolution and the imaginary component multiplied by the imaginary unit, adding one of the branched imaginary components to one of the branched real components, and subtracting another of the branched imaginary components from another of the branched real components; an input signal generation section that, for each subcarrier of each polarized wave, generates, as input signals, the real component and the imaginary component of each polarized wave after the complex signal processing of the subcarrier and phase conjugates of the real component and the imaginary component of each polarized wave after the complex signal processing of a symmetric subcarrier that is another subcarrier in a frequency domain symmetric to a frequency domain of the foregoing subcarrier across a center frequency of the reception signal; an equalization section that, for each subcarrier of each polarized wave, generates a first addition signal obtained by a process in which each of the real component and the imaginary component of each polarized wave of the subcarrier included in the input signals is multiplied by a complex impulse response, then resulting components are added, and further a phase rotation for frequency offset compensation is applied and a second addition signal obtained by a process in which each of the phase conjugate of the real component and the phase conjugate of the imaginary component of each polarized wave of the symmetric subcarrier included in the input signals is multiplied by a complex impulse response, then resulting components are added, and further a phase rotation opposite to the phase rotation for frequency offset compensation is applied; and a compensation section that, for each subcarrier of each polarized wave, adds or subtracts a transmission data bias correction signal to or from a signal obtained by adding the first addition signal and the second addition signal.

A communication system of an aspect of the present invention includes: a transmitter; and a receiver including any of the signal processing apparatuses described above.

Advantageous Effects of Invention

By the present invention, equalization processing can be performed with good accuracy while increases in tap convergence and circuit scale are suppressed.

BRIEF DESCRIPTION OF DRAWINGS

FIG. 17 is a diagram showing experimental results of a receiver of a conventional technology.

FIG. 18 is a diagram showing experimental results of a receiver of the second embodiment.

DESCRIPTION OF EMBODIMENTS

Hereinbelow, embodiments of the present invention are described in detail with reference to the drawings.

First Embodiment

Figure 1:
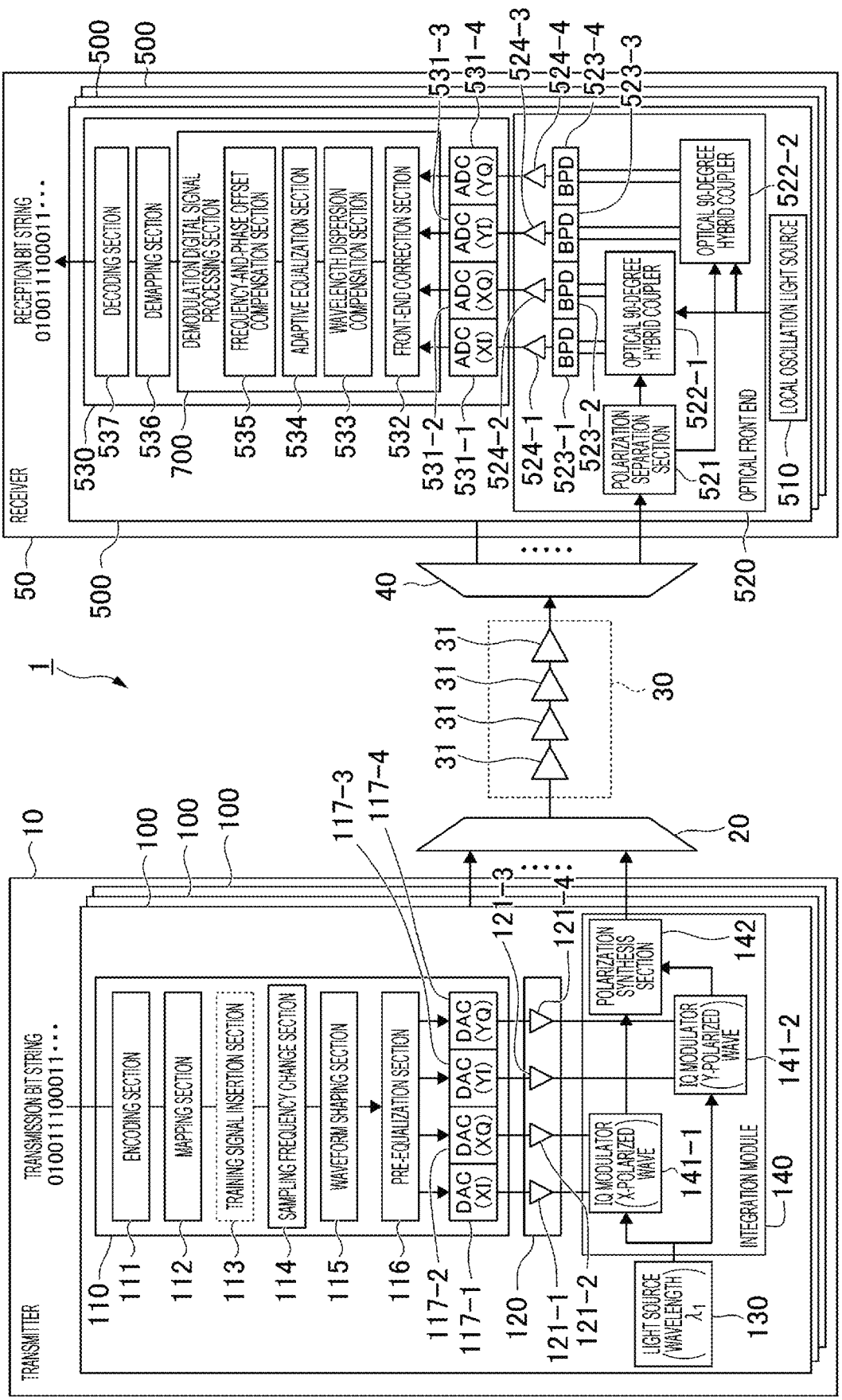
FIG. 1 is a configuration diagram of a digital coherent optical transmission system according to a first embodiment of the present invention.

FIG. 1 is a configuration diagram of a digital coherent optical transmission system 1 according to a first embodiment. The digital coherent optical transmission system 1 includes a transmitter 10 and a receiver 50. The receiver 50 receives a polarization-multiplexed optical signal from the transmitter 10.

The transmitter 10 includes one or more transmission sections 100. In the present embodiment, the transmitter 10 includes transmission sections 100 for the number of channels of WDM. The transmission sections 100 output optical signals of different wavelengths. A WDM multiplexer 20 multiplexes the optical signals outputted by the transmission sections 100, and outputs the multiplexed optical signal to an optical fiber transmission line 30. The optical fiber transmission line 30 includes an arbitrary number of optical amplifiers 31. Each optical amplifier 31 receives an optical signal from the optical fiber transmission line 30 on the transmitter 10 side, amplifies the optical signal, and outputs the amplified optical signal to the optical fiber transmission line 30 on the receiver 50 side. A WDM demultiplexer 40 demultiplexes the optical signal transmitted through the optical fiber transmission line 30 by wavelength. The receiver 50 includes one or more reception sections 500. In the present embodiment, the receiver 50 includes reception sections 500 for the number of channels of WDM. Each reception section 500 receives an optical signal demultiplexed by the WDM demultiplexer 40. The wavelengths of the optical signals received by the reception sections 500 are different.

The transmission section 100 includes a digital signal processing section 110, a modulator driver 120, a light source 130, and an integration module 140. The digital signal processing section 110 includes an encoding section 111, a mapping section 112, a training signal insertion section 113, a sampling frequency change section 114, a waveform shaping section 115, a pre-equalization section 116, and digital-to-analog converters (DAC) 117-1 to 117-4.

The encoding section 111 outputs a transmission signal obtained by performing FEC (forward error correction) encoding on a transmission bit string. The mapping section 112 maps the transmission signal outputted from the encoding section 111 to symbols. The training signal insertion section 113 inserts a known training signal into the transmission signal symbol-mapped by the mapping section 112. The sampling frequency change section 114 performs up-sampling by changing the sampling frequency for the transmission signal into which a training signal is inserted. The waveform shaping section 115 limits the band of the transmission signal subjected to sampling.

The pre-equalization section 116 compensates for distortion of the waveform of the transmission signal band-limited by the waveform shaping section 115, and outputs the result to the DACs 117-1 to 117-4. The DAC 117-1 converts an I (in-phase) component of an X-polarized wave of the transmission signal inputted from the pre-equalization section 116 from a digital signal to an analog signal, and outputs the converted analog signal to the modulator driver 120. The DAC 117-2 converts a Q (quadrature) component of the X-polarized wave of the transmission signal inputted from the pre-equalization section 116 from a digital signal to an analog signal, and outputs the converted analog signal to the modulator driver 120. The DAC 117-3 converts an I component of a Y-polarized wave of the transmission signal inputted from the pre-equalization section 116 from a digital signal to an analog signal, and outputs the converted analog signal to the modulator driver 120. The DAC 117-4 converts a Q component of the Y-polarized wave of the transmission signal inputted from the pre-equalization section 116 from a digital signal to an analog signal, and outputs the converted analog signal to the modulator driver 120.

The modulator driver 120 includes amplifiers 121-1 to 121-4. The amplifier 121-$i$ (i is an integer of 1 or more and 4 or less) amplifies the analog signal outputted from the DAC 117-$i$, and uses the amplified analog signal to drive a modulator of the integration module 140. The light source 130 is, for example, an LD (semiconductor laser). The light source 130 included in the p-th transmission section 100 outputs light of a wavelength of λp (p is an integer not less than 1 and not more than the number of channels of WDM).

The integration module 140 includes IQ modulators 141-1 and 141-2 and a polarization synthesis section 142. The IQ modulator 141-1 outputs an optical signal of the X-polarized wave generated by modulating the optical signal outputted by the light source 130 with the I component of the X-polarized wave outputted from the amplifier 121-1 and the Q component of the X-polarized wave outputted from the amplifier 121-2. The IQ modulator 141-2 outputs an optical signal of the Y-polarized wave generated by modulating the optical signal outputted by the light source 130 with the I component of the Y-polarized wave outputted from the amplifier 121-3 and the Q component of the Y-polarized wave outputted from the amplifier 121-4. The polarization synthesis section 142 polarization-synthesizes the optical signal of the X-polarized wave outputted by the IQ modulator 141-1 and the optical signal of the Y-polarized wave outputted by the IQ modulator 141-2, and outputs the synthesized optical signal to the WDM multiplexer 20.

The reception section 500 includes a local oscillation light source 510, an optical front end 520, and a digital signal processing section 530. The local oscillation light source 510 is, for example, an LD. The local oscillation light source 510 outputs local oscillation light (an LO, a local oscillator).

The optical front end 520 converts an optical signal into an electric signal while keeping the phase and amplitude of a polarization-multiplexed phase-modulated signal. The optical front end 520 includes a polarization separation section 521, optical 90-degree hybrid couplers 522-1 and 522-2, BPDs (balanced photodiodes) 523-1 to 523-4, and amplifiers 524-1 to 524-4.

The polarization separation section 521 separates the inputted optical signal into an X-polarized wave and a Y-polarized wave. The polarization separation section 521 outputs the optical signal of the X-polarized wave to the optical 90-degree hybrid coupler 522-1, and outputs the optical signal of the Y-polarized wave to the optical 90-degree hybrid coupler 522-2. The optical 90-degree hybrid coupler 522-1 causes the optical signal of the X-polarized wave and the local oscillation light outputted from the local oscillation light source 510 to interfere with each other, and extracts an I component and a Q component of the reception light electric field. The optical 90-degree hybrid coupler 522-1 outputs the extracted I component of the X-polarized wave to the BPD 523-1, and outputs the extracted Q component of the X-polarized wave to the 523-2. The optical 90-degree hybrid coupler 522-2 causes the optical signal of the Y-polarized wave and the local oscillation light outputted from the local oscillation light source 510 to interfere with each other, and extracts an I component and a Q component of the reception light electric field. The optical 90-degree hybrid coupler 522-2 outputs the extracted I component of the Y-polarized wave to the BPD 523-3, and outputs the extracted Q component of the Y-polarized wave to the BPD 523-4.

The BPDs 523-1 to 523-4 are differential input type photoelectric converters. The BPD 523-$i$ (i is an integer of 1 or more and 4 or less) outputs, to the amplifier 524-$i$, a difference value between photocurrents generated in two photodiodes having even characteristics. The BPD 523-1 converts the I component of the reception signal of the X-polarized wave into an electric signal, and outputs the electric signal after conversion to the amplifier 524-1. The BPD 523-2 converts the Q component of the reception signal of the X-polarized wave into an electric signal, and outputs the electric signal after conversion to the amplifier 524-2. The BPD 523-3 converts the I component of the reception signal of the Y-polarized wave into an electric signal, and outputs the electric signal after conversion to the amplifier 524-3. The BPD 523-4 converts the Q component of the reception signal of the Y-polarized wave into an electric signal, and outputs the electric signal after conversion to the amplifier 524-4. The amplifier 524-$i$ (i is an integer of 1 or more and 4 or less) amplifies the electric signal outputted from the BPD 523-$i$, and outputs the amplified electric signal to the digital signal processing section 530.

The digital signal processing section 530 includes analog-to-digital converters (ADC) 531-1 to 531-4, a demodulation digital signal processing section 700, a demapping section 536, and a decoding section 537. The demodulation digital signal processing section 700 includes a front-end correction section 532, a wavelength dispersion compensation section 533, an adaptive equalization section 534, and a frequency-and-phase offset compensation section 535.

The ADC 531-$i$ (i is an integer of 1 or more and 4 or less) converts the electric signal outputted from the amplifier 524-$i$ from an analog signal to a digital signal, and outputs the converted digital signal to the front-end correction section 532.

The front-end correction section 532 receives the I component of the reception signal of the X-polarized wave from the ADC 531-1, receives the Q component of the reception signal of the X-polarized wave from the ADC 531-2, receives the I component of the reception signal of the Y-polarized wave from the ADC 531-3, and receives the Q component of the reception signal of the Y-polarized wave from the ADC 531-4. The front-end correction section 532 uses each inputted signal to generate a reception signal subjected to compensation of frequency characteristics in the optical front end 520, and outputs the generated reception signal to the wavelength dispersion compensation section 533.

The wavelength dispersion compensation section 533 estimates wavelength dispersion received in the optical fiber transmission line 30, compensates for the estimated wavelength dispersion for the electric signal outputted from the front-end correction section 532, and outputs the electric signal subjected to wavelength dispersion compensation to the adaptive equalization section 534. The adaptive equalization section 534 adaptively performs equalization processing on the reception signal outputted from the wavelength dispersion compensation section 533. The frequency-and-phase offset compensation section 535 performs processing such as compensation of a frequency offset and phase noise on the reception signal subjected to equalization processing by the adaptive equalization section 534.

The demapping section 536 determines symbols of the reception signal outputted by the frequency-and-phase offset compensation section 535, and converts the determined symbols into binary data. The decoding section 537 performs error correction decoding processing such as FEC on the binary data demapped by the demapping section 536, and thereby obtains a reception bit string.

Although the above embodiment describes an example of one optical fiber transmission line, the embodiment is similarly implemented with a spatially multiplexed transmission system (for example, a multi-core fiber, a multi-mode fiber, and free space transmission).

Figure 2:
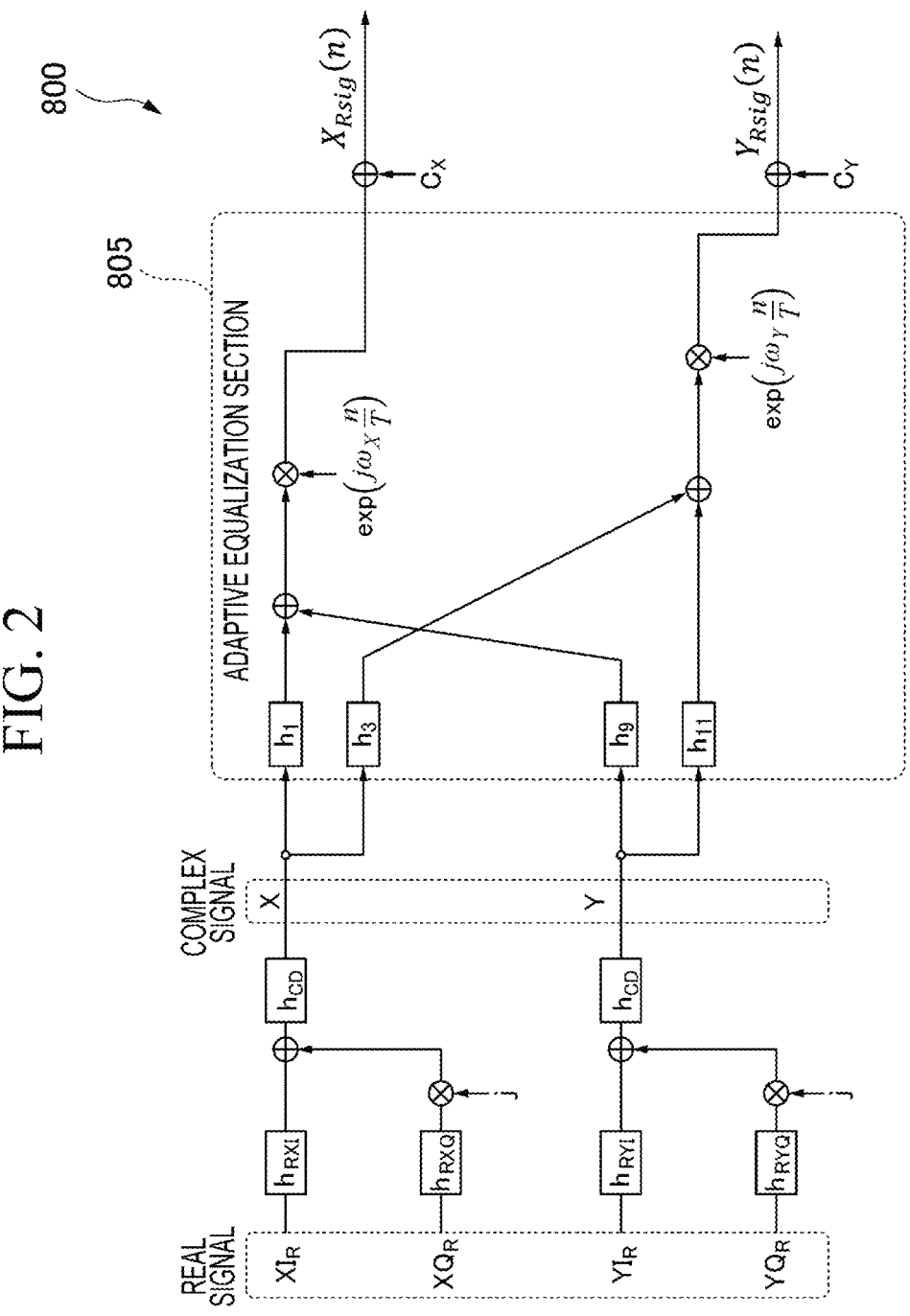
FIG. 2 is a diagram showing a configuration of a demodulation digital signal processing section to which a conventional technology is applied.

Here, a demodulation digital signal processing section of a digital coherent optical receiver using a conventional technology is described. FIG. 2 is a diagram showing a configuration of a demodulation digital signal processing section 800 to which a conventional technology is applied. The demodulation digital signal processing section 800 is used as a general 2×2 MIMO adaptive equalization circuit. Hereinafter, a receiver including the demodulation digital signal processing section 800 is referred to as receiver A. For example, receiver A is a similar configuration to the receiver 50 shown in FIG. 1, and includes the demodulation digital signal processing section 800 shown in FIG. 2 as the demodulation digital signal processing section 700.

The demodulation digital signal processing section 800 receives a real component $XI_R$ and an imaginary component $XQ_R$ of a reception complex signal of an X-polarized wave and a real component $YI_R$ and an imaginary component $YQ_R$ of a reception complex signal of a Y-polarized wave converted into digital signals by the ADCs 531-1 to 531-4 of receiver A. The demodulation digital signal processing section 800 adds a signal obtained by applying an impulse response $h_{RXI}$ for compensating for frequency characteristics of receiver A to the real component $XI_R$ and a signal obtained by applying an impulse response $h_{RXQ}$ for compensating for frequency characteristics of receiver A to the imaginary component $XQ_R$ and further multiplying the resulting component by the imaginary unit j. The demodulation digital signal processing section 800 applies a complex impulse response $h_{CD}$ for wavelength dispersion compensation to the addition result to obtain a complex signal X of the X-polarized wave. Further, the demodulation digital signal processing section 800 adds a signal obtained by applying an impulse response $h_{RYI}$ for compensating for frequency characteristics of receiver A to the real component $YI_R$ and a signal obtained by applying an impulse response $h_{RYQ}$ for compensating for frequency characteristics of receiver A to the imaginary component $YQ_R$ and further multiplying the resulting component by the imaginary unit j. The demodulation digital signal processing section 800 applies a complex impulse response $h_{CD}$ for wavelength dispersion compensation to the addition result to obtain a complex signal Y of the Y-polarized wave.

An adaptive equalization section 805 of the demodulation digital signal processing section 800 adds the complex signal Y convolved with impulse response $h_9$ to the complex signal X convolved with impulse response $h_1$, and then applies a frequency offset $\exp(j\omega_X(n/T))$. n represents the symbol interval, and T represents the period of the symbol. The adaptive equalization section 805 adds (or subtracts) a transmission data bias correction signal $C_X$ for canceling the bias deviation of the X-polarization component to (or from) the complex signal to which the frequency offset is applied, and thereby obtains a reception signal $X_{Rsig}(n)$ of the X-polarization component subjected to distortion correction. Further, the adaptive equalization section 805 adds the complex signal X convolved with impulse response $h_3$ to the complex signal Y convolved with impulse response $h_{11}$, and then applies a frequency offset $\exp(j\omega_Y(n/T))$. The adaptive equalization section 805 adds (or subtracts) a transmission data bias correction signal $C_Y$ for canceling the bias deviation of the Y-polarization component to (or from) the complex signal to which the frequency offset is applied, and thereby obtains a reception signal $Y_{Rsig}(n)$ of the Y-polarization component subjected to distortion correction.

Figure 3:
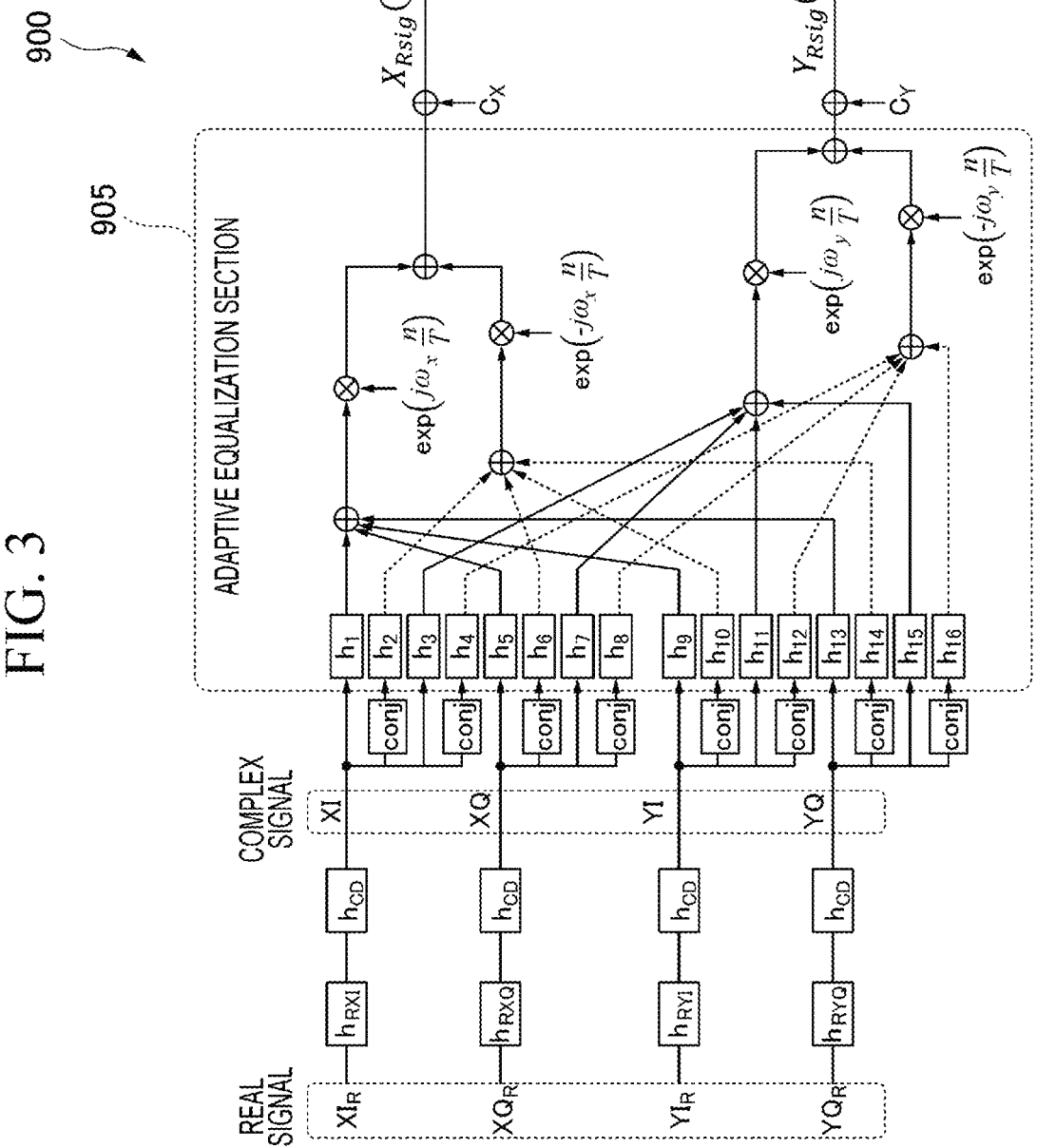
FIG. 3 is a diagram showing a configuration of a demodulation digital signal processing section to which a conventional technology is applied.

Next, another demodulation digital signal processing section to which a conventional technology is applied is described. FIG. 3 is a diagram showing a configuration of a demodulation digital signal processing section 900 to which a conventional technology is applied. The demodulation digital signal processing section 900 uses the technology of Patent Literature 1. Hereinafter, a receiver including the demodulation digital signal processing section 900 is referred to as receiver B. For example, receiver B is a similar configuration to the receiver 50 shown in FIG. 1, and includes the demodulation digital signal processing section 900 shown in FIG. 3 as the demodulation digital signal processing section 700. The demodulation digital signal processing section 900 operates as a MIMO equalizer.

First, the principle of an equalization processing method applied to the demodulation digital signal processing section 900 is described. An X-polarization component of an ideal polarization-multiplexed optical signal to be transmitted is represented by complex signal $S_{X0}$, and a Y-polarization component thereof is represented by complex signal $S_{Y0}$. Complex signal $S_{X1}$ of an X-polarization component and complex signal $S_{Y1}$ of a Y-polarization component that are transmitter outputs taking account of IQ imbalance due to variations between modulator drivers 120 in the transmitter 10, skew between lanes, and frequency characteristics can be described as Formula (1) below using four complex impulse responses $h_{Tx}$, $g_{Tx}$, $h_{Ty}$, and $g_{Ty}$, and bias deviation terms $C_X$ and $C_Y$ (widely linear expression). "*" on the right shoulder indicates a phase conjugate.

[Math. 1]

$$\begin{pmatrix} S_{X1} \\ S_{X1}^* \\ S_{Y1} \\ S_{Y1}^* \end{pmatrix} = \begin{pmatrix} C_X \\ C_X^* \\ C_Y \\ C_Y^* \end{pmatrix} + \begin{pmatrix} h_{Tx} & g_{Tx} & 0 & 0 \\ g_{Tx}^* & h_{Tx}^* & 0 & 0 \\ 0 & 0 & h_{Ty} & g_{Ty} \\ 0 & 0 & g_{Ty}^* & h_{Ty}^* \end{pmatrix} \begin{pmatrix} S_{X0} \\ S_{X0}^* \\ S_{Y0} \\ S_{Y0}^* \end{pmatrix} \quad (1)$$

Complex signal $S_{X1}$ of the X-polarization component and complex signal $S_{Y1}$ of the Y-polarization component receive, during transmission through the optical fiber transmission line 30, wavelength dispersion, polarization rotation, polarization mode dispersion, and polarization-dependent loss. When wavelength dispersion is represented by a complex impulse response $h_{CD0}$ and the influence of polarization rotation/polarization mode dispersion is represented by $h_{xx}$, $h_{yx}$, $h_{yy}$, and $h_{xy}$, optical signal $S_{X2}$ of the X-polarization component and optical signal $S_{Y2}$ of the Y-polarization component after transmission through the optical fiber can be expressed by Formula (2) below.

[Math. 2]

$$\begin{pmatrix} S_{X2} \\ S_{X2}^* \\ S_{Y2} \\ S_{Y2}^* \end{pmatrix} = \begin{pmatrix} h_{CD0} & 0 & 0 & 0 \\ 0 & h_{CD0}^* & 0 & 0 \\ 0 & 0 & h_{CD0} & 0 \\ 0 & 0 & 0 & h_{CD0}^* \end{pmatrix} \begin{pmatrix} h_{xx} & 0 & h_{yx} & 0 \\ 0 & h_{xx}^* & 0 & h_{yx}^* \\ h_{xy} & 0 & h_{yy} & 0 \\ 0 & h_{xy}^* & 0 & h_{yy}^* \end{pmatrix} \begin{pmatrix} S_{X1} \\ S_{X1}^* \\ S_{Y1} \\ S_{Y1}^* \end{pmatrix} \quad (2)$$

When there are frequency offsets $\omega_x$ and $\omega_y$ between laser light outputted by the light source 130 of the transmitter 10 and local oscillation light outputted by the local oscillation light source 510 of receiver B, signal $S_{X3}$ of the X-polarization component and signal $S_{Y3}$ of the Y-polarization component after photoelectric conversion can be expressed by Formula (3) below.

[Math. 3]

$$\begin{pmatrix} S_{X3} \\ S_{X3}^* \\ S_{Y3} \\ S_{Y3}^* \end{pmatrix} = \begin{pmatrix} \exp(j\omega_x t) & 0 & 0 & 0 \\ 0 & \exp(-j\omega_x t) & 0 & 0 \\ 0 & 0 & \exp(j\omega_y t) & 0 \\ 0 & 0 & 0 & \exp(-j\omega_y t) \end{pmatrix} \begin{pmatrix} S_{X2} \\ S_{X2}^* \\ S_{Y2} \\ S_{Y2}^* \end{pmatrix} \quad (3)$$

Further, a reception complex signal $S_{X4}$ of the X-polarization component and a reception complex signal $S_{Y4}$ of the Y-polarization component taking account of photoelectric conversion in the BPDs 523-1 to 523-4, frequency characteristics and IQ imbalance of the reception front end such as the ADCs 531-1 to 531-4, skew, etc. can be expressed by Formula (4) by using four complex impulse responses $h_{Rx}$, $g_{Rx}$, $h_{Ry}$, and $g_{Ry}$.

[Math. 4]

$$\begin{pmatrix} S_{X4} \\ S_{X4}^* \\ S_{Y4} \\ S_{Y4}^* \end{pmatrix} = \begin{pmatrix} h_{Rx} & g_{Rx} & 0 & 0 \\ g_{Rx}^* & h_{Rx}^* & 0 & 0 \\ 0 & 0 & h_{Ry} & g_{Ry} \\ 0 & 0 & g_{Ry}^* & h_{Ry}^* \end{pmatrix} \begin{pmatrix} S_{X3} \\ S_{X3}^* \\ S_{Y3} \\ S_{Y3}^* \end{pmatrix} \quad (4)$$

Therefore, when an appropriate 4×4 matrix W and constant terms $C_{biasX}$ and $C_{biasY}$ are defined, the reception complex signal $S_{X4}$ of the X-polarization component and the reception complex signal $S_{Y4}$ of the Y-polarization component can be expressed by Formula (5).

[Math. 5]

$$\begin{pmatrix} S_{X4} \\ S_{X4}^* \\ S_{Y4} \\ S_{Y4}^* \end{pmatrix} = \begin{pmatrix} \exp(j\omega_x n) & \exp(-j\omega_x n) & 0 & 0 \\ \exp(-j\omega_x n) & \exp(j\omega_x n) & 0 & 0 \\ 0 & 0 & \exp(j\omega_y n) & \exp(-j\omega_y n) \\ 0 & 0 & \exp(-j\omega_y n) & \exp(j\omega_y n) \end{pmatrix} \overbrace{\begin{pmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{pmatrix}}^{W} \begin{pmatrix} S_{X0} \\ S_{X0}^* \\ S_{Y0} \\ S_{Y0}^* \end{pmatrix} + \begin{pmatrix} C_{biasX} \\ C_{biasX}^* \\ C_{biasY} \\ C_{biasY}^* \end{pmatrix} \quad (5)$$

From Formulas (1) to (5), the reception complex signal $S_{X4}$ of the X-polarization component at receiver B is expressed by Formula (6), and the reception complex signal $S_{Y4}$ of the Y-polarization component at receiver B is expressed by Formula (7).

[Math. 6]

$$\begin{aligned} S_{X4} = &\exp(j\omega_x n) \cdot (h_{Rx} * h_{CD0} * h_{xx} * h_{Tx} * S_{X0}) \\ &+ \exp(j\omega_x n) \cdot (h_{Rx} * h_{CD0} * h_{xx} * g_{Tx} * S_{X0}^*) \\ &+ \exp(j\omega_x n) \cdot (h_{Rx} * h_{CD0} * h_{yx} * h_{Ty} * S_{Y0}) \\ &+ \exp(j\omega_x n) \cdot (h_{Rx} * h_{CD0} * h_{yx} * g_{Ty} * S_{Y0}^*) \\ &+ \exp(-j\omega_x n) \cdot (g_{Rx} * h_{CD0}^* * h_{xx}^* * h_{Tx}^* * S_{X0}^*) \\ &+ \exp(-j\omega_x n) \cdot (g_{Rx} * h_{CD0}^* * h_{xx}^* * g_{Tx}^* * S_{X0}) \\ &+ \exp(-j\omega_x n) \cdot (g_{Rx} * h_{CD0}^* * h_{yx}^* * h_{Tx}^* * S_{Y0}^*) \\ &+ \exp(-j\omega_x n) \cdot (g_{Rx} * h_{CD0}^* * h_{yx}^* * g_{Tx}^* * S_{Y0}) \\ &+ C_{biasX} \end{aligned} \quad (6)$$

[Math. 7]

$$\begin{aligned} S_{Y4} = &\exp(j\omega_y n) \cdot (h_{Ry} * h_{CD0} * h_{xy} * h_{Tx} * S_{X0}) \\ &+ \exp(j\omega_y n) \cdot (h_{Ry} * h_{CD0} * h_{xy} * g_{Tx} * S_{X0}^*) \\ &+ \exp(j\omega_y n) \cdot (h_{Ry} * h_{CD0} * h_{yy} * h_{Ty} * S_{Y0}) \\ &+ \exp(j\omega_y n) \cdot (h_{Ry} * h_{CD0} * h_{yy} * g_{Ty} * S_{Y0}^*) \\ &+ \exp(-j\omega_y n) \cdot (g_{Ry} * h_{CD0}^* * h_{xy}^* * h_{Tx}^* * S_{X0}^*) \\ &+ \exp(-j\omega_y n) \cdot (g_{Ry} * h_{CD0}^* * h_{xy}^* * g_{Tx}^* * S_{X0}) \\ &+ \exp(-j\omega_y n) \cdot (g_{Ry} * h_{CD0}^* * h_{yy}^* * h_{Tx}^* * S_{Y0}^*) \\ &+ \exp(-j\omega_y n) \cdot (g_{Ry} * h_{CD0}^* * h_{yy}^* * g_{Tx}^* * S_{Y0}) \\ &+ C_{biasY} \end{aligned} \quad (7)$$

The digital signal processing section 530 of an actual coherent receiver receives real components and imaginary components of the reception complex signals $S_{X4}$ and $S_{Y4}$. Thus, when the above formulas are further modified, Formula (8) and Formula (9) are obtained.

$$S_{X0} = \exp(j\omega_x n)\{h_1 h_{CD0}^{-1} \mathfrak{R}[S_{X4}] + \quad (8)$$
$$h_5 h_{CD0}^{-1} \mathfrak{T}[S_{X4}] + h_9 h_{CD0}^{-1} \mathfrak{R}[S_{Y4}] + h_{13} h_{CD0}^{-1} \mathfrak{T}[S_{Y4}]\} +$$
$$\exp(-j\omega_x n)\{h_2 h_{CD0}^{*-1} \mathfrak{R}[S_{X4}] + h_6 h_{CD0}^{*-1} \mathfrak{T}[S_{X4}] +$$
$$h_{10} h_{CD0}^{*-1} \mathfrak{R}[S_{Y4}] + h_{14} h_{CD0}^{*-1} \mathfrak{T}[S_{Y4}]\} + C_{biasX}$$

$$S_{Y0} = \exp(j\omega_y n)\{h_3 h_{CD0}^{-1} \mathfrak{R}[S_{X4}] + \quad (9)$$
$$h_7 h_{CD0}^{-1} \mathfrak{T}[S_{X4}] + h_{11} h_{CD0}^{-1} \mathfrak{R}[S_{Y4}] + h_{15} h_{CD0}^{-1} \mathfrak{T}[S_{Y4}]\} +$$
$$\exp(-j\omega_y n)\{h_4 h_{CD0}^{*-1} \mathfrak{R}[S_{X4}] + h_8 h_{CD0}^{*-1} \mathfrak{T}[S_{X4}] +$$
$$h_{12} h_{CD0}^{*-1} \mathfrak{R}[S_{Y4}] + h_{16} h_{CD0}^{*-1} \mathfrak{T}[S_{Y4}]\} + C_{biasY}$$

Here, $\mathfrak{R}[z]$ represents the real part of the complex number z and $\mathfrak{T}[z]$ represents the imaginary part of the complex number z Impulse responses $h_1$ to $h_{16}$ in Formula (8) and Formula (9) are elements of the inverse matrix of the matrix W.

Thus, for each of the I (real) component signal ($XI_R$) and the Q (imaginary) component signal ($XQ_R$) of the X-polarization component and the I component signal ($YI_R$) and the Q component signal ($YQ_R$) of the Y-polarization component, which are four real signals outputted by the coherent receiver (the optical front end 520), the demodulation digital signal processing section 900 generates a signal in which the inverse response $h_{CD0}^{-1}$ of the complex impulse response $h_{CD0}$ of wavelength dispersion is convolved. The inverse response $h_{CD0}^{-1}$ of the complex impulse response $h_{CD0}$ of wavelength dispersion is a complex impulse response $h_{CD}$ for wavelength dispersion compensation. An adaptive equalization section 905 has, for the X-polarization component and the Y-polarization component, a total of eight inputs of an I component signal (XI) and a Q component signal (XQ) of the X-polarization component and an I component signal (YI) and a Q component signal (YQ) of the Y-polarization component subjected to the above convolution, and signals obtained by taking the phase conjugates (conj) of the above signals. The demodulation digital signal processing section 900 demodulates the reception signal on the basis of Formula (8) and Formula (9).

An operation of the demodulation digital signal processing section 900 based on the above principle will now be described. The demodulation digital signal processing section 900 receives a real component $XI_R$ and an imaginary component $XQ_R$ of a reception complex signal $S_{X4}$ of an X-polarized wave and a real component $YI_R$ and an imaginary component $YQ_R$ of a reception complex signal $S_{Y4}$ of a Y-polarized wave converted into digital signals by the ADCs 531-1 to 531-4. The demodulation digital signal processing section 900 convolves an impulse response for compensating for frequency characteristics of receiver B and a complex impulse response hcp for wavelength dispersion compensation with each of the real component $XI_R$, the imaginary component $XQ_R$, the real component $YI_R$, and the imaginary component $YQ_R$, and applies a phase rotation for frequency offset compensation. Thereby, two complex signals are outputted for each of the X-polarization component and the Y-polarization component. Subsequently, the demodulation digital signal processing section 900 generates the phase conjugates of the two complex signals. Thereby, for the X-polarization component and the Y-polarization component, the demodulation digital signal processing section 900 generates, as inputs to the adaptive equalization section 905, eight signals of a real component XI, an imaginary component XQ, a real component YI, and an imaginary component YQ, and the phase conjugates of them. Thereby, in the adaptive equalization section 905 of receiver B, IQ imbalance, skew between IQ lanes, bias deviations of the IQ modulators 141-1 and 141-2, etc. caused in the transmitter 10 can be dynamically compensated for in addition to impairments caused in the optical fiber transmission line 30 and receiver B, and the reception signal is improved in quality.

Specifically, the demodulation digital signal processing section 900 generates a real component XI obtained by applying an impulse response $h_{RXI}$ for compensating for frequency characteristics of receiver B and a complex impulse response $h_{CD}$ for wavelength dispersion compensation to a real component $XI_R$ of a reception complex signal $S_{X4}$ of an X-polarization component, and generates an imaginary component XQ obtained by applying an impulse response $h_{RXQ}$ for compensating for frequency characteristics of receiver B and a complex impulse response $h_{CD}$ for wavelength dispersion compensation to an imaginary component $XQ_R$ of the reception complex signal $S_{X4}$ of the X-polarization component. Similarly, the demodulation digital signal processing section 900 generates a real component YI obtained by applying an impulse response $h_{RYI}$ for compensating for frequency characteristics of receiver B and a complex impulse response $h_{CD}$ for wavelength dispersion compensation to a real component $YI_R$ of a reception complex signal $S_{Y4}$ of a Y-polarization component, and generates an imaginary component YQ obtained by applying an impulse response $h_{RYQ}$ for compensating for frequency characteristics of receiver B and a complex impulse response hcp for wavelength dispersion compensation to an imaginary component $YQ_R$ of the reception complex signal $S_{Y4}$ of the Y-polarization component. The demodulation digital signal processing section 900 branches each of the real component XI, the imaginary component XQ, the real component YI, and the imaginary component YQ convolved with impulse responses for compensating for frequency characteristics of receiver B and impulse responses for wavelength dispersion compensation into four. The demodulation digital signal processing section 900 inputs two of the branched four signals of each of the real component XI, the imaginary component XQ, the real component YI, and the imaginary component YQ as they are to the adaptive equalization section 905, and converts the other two signals into phase conjugate signals and inputs the phase conjugate signals to the adaptive equalization section 905.

The adaptive equalization section 905 adds a real component XI convolved with impulse response $h_1$, an imaginary component XQ convolved with impulse response $h_5$, a real component YI convolved with impulse response $h_9$, and an imaginary component YQ convolved with impulse response $h_{13}$, and then applies a frequency offset $\exp(j\omega_x(n/T))$. n represents the symbol interval, and T represents the period of the symbol. Further, the adaptive equalization section 905 adds a real component phase conjugate XI* convolved with impulse response $h_2$, an imaginary component phase conjugate XQ* convolved with impulse response $h_6$, a real component phase conjugate YI* convolved with impulse response $h_{10}$, and an imaginary component phase conjugate YQ* convolved with impulse response $h_{14}$, and then applies a frequency offset $\exp(-j\omega_x(n/T))$. The adaptive equalization section 905 adds the addition signal to which the frequency offset $\exp(j\omega_x(n/T))$ is applied and the addition signal to which the frequency offset $\exp(-j\omega_x(n/T))$ is applied, and thereby generates a reception signal of the X-polarization component. The adaptive equalization section 905 adds (or subtracts) a transmission data bias correction signal $C_X$ for canceling the bias deviation of the X-polarization component to (or from) the generated reception signal of the X-polarization component, and thereby generates a reception signal $X_{Rsig}(n)$ of the X-polarization component subjected to distortion correction.

On the other hand, the adaptive equalization section 905 adds a real component XI convolved with impulse response $h_3$, an imaginary component XQ convolved with impulse response $h_7$, a real component YI convolved with impulse response $h_{11}$, and an imaginary component YQ convolved with impulse response $h_{15}$, and then applies a frequency offset $\exp(j\omega_y(n/T))$. Further, the adaptive equalization section 905 adds a real component phase conjugate XI* convolved with impulse response $h_4$, an imaginary component phase conjugate XQ* convolved with impulse response $h_8$, a real component phase conjugate YI* convolved with impulse response $h_{12}$, and an imaginary component phase conjugate YQ* convolved with impulse response $h_{16}$, and then applies a frequency offset $\exp(-j\omega_y(n/T))$. The adaptive equalization section 905 adds the addition signal to which the frequency offset $\exp(j\omega_y(n/T))$ is applied and the addition signal to which the frequency offset $\exp(-j\omega_y(n/T))$ is applied, and thereby generates a reception signal of the Y-polarization component. The adaptive equalization section 905 adds (or subtracts) a transmission data bias correction signal $C_Y$ for canceling the bias deviation of the Y-polarization component to (or from) the generated reception signal of the Y-polarization component, and thereby generates a reception signal $Y_{Rsig}(n)$ of the Y-polarization component subjected to distortion correction.

Note that the complex impulse response $h_{CD}$ for wavelength dispersion compensation, the impulse responses $h_1$ to $h_{16}$, and the frequency offsets $\exp(j\omega_x n/T)$, $\exp(-j\omega_x n/T)$, $\exp(j\omega_y n/T)$, and $\exp(-j\omega_y n/T)$ are adaptively and dynamically changed. Receiver B acquires these values by an arbitrary method.

Next, the principle of the present embodiment is described.

Figure 4:
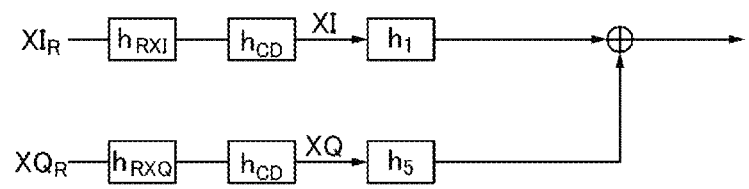
FIG. 4 is a diagram showing part of signal processing performed by a demodulation digital signal processing section to which a conventional technology is applied.

FIG. 4 is a diagram showing part of signal processing performed by the demodulation digital signal processing section 900. The demodulation digital signal processing section 900 generates a real component XI obtained by applying an impulse response $h_{RXI}$ for compensating for frequency characteristics of receiver B and a complex impulse response $h_{CD}$ for wavelength dispersion compensation to a real component $XI_R$ of a reception complex signal $S_{X4}$ of an X-polarization component. Further, the demodulation digital signal processing section 900 generates an imaginary component XQ obtained by applying an impulse response $h_{RXQ}$ for compensating for frequency characteristics of receiver B and a complex impulse response $h_{CD}$ for wavelength dispersion compensation to an imaginary component $XQ_R$ of the reception complex signal $S_{X4}$ of the X-polarization component. The demodulation digital signal processing section 900 adds the real component XI convolved with impulse response $h_1$ and the imaginary component XQ convolved with impulse response $h_5$. That is, the demodulation digital signal processing section 900 generates a signal of $h_1*XI+h_5*XQ$.

Figure 5:
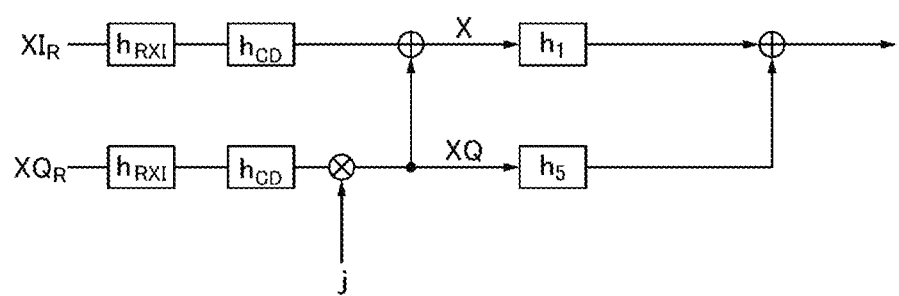
FIG. 5 is a diagram showing part of signal processing performed by a demodulation digital signal processing section of the first embodiment.

FIG. 5 is a diagram showing part of signal processing performed by the demodulation digital signal processing section 700 of the present embodiment. Similarly to the demodulation digital signal processing section 900, the demodulation digital signal processing section 700 generates a real component XI obtained by applying an impulse response $h_{RXI}$ for compensating for frequency characteristics of the receiver 50 and a complex impulse response $h_{CD}$ for wavelength dispersion compensation to a real component $XI_R$ of a reception complex signal $S_{X4}$ of an X-polarization component. Further, the demodulation digital signal processing section 700 generates an imaginary component XQ obtained by applying an impulse response $h_{RXQ}$ for compensating for frequency characteristics of the receiver 50 and a complex impulse response $h_{CD}$ for wavelength dispersion compensation to an imaginary component $XQ_R$ of the reception complex signal $S_{X4}$ of the X-polarization component similarly to the demodulation digital signal processing section 900, and then multiplies the imaginary component XQ by the imaginary unit j to generate an imaginary component jXQ. The demodulation digital signal processing section 700 branches the imaginary component jXQ. The demodulation digital signal processing section 700 adds the real component XI and one of the branched imaginary components jXQ to generate a complex signal X of the X-polarized wave. The demodulation digital signal processing section 700 adds a signal obtained by convolving impulse response $h_1$ with the complex signal X and a signal obtained by convolving impulse response $h_5$ with the imaginary component jXQ. That is, the demodulation digital signal processing section 700 generates a signal of $h_1*(XI+jXQ)+h_5*jXQ=h_1*XI+j(h_1+h_5)XQ$. That is, processing equivalent to that of the demodulation digital signal processing section 900 can be performed by setting $h_5$ of the demodulation digital signal processing section 700 to $j(h_1+h_5)$ in the demodulation digital signal processing section 900. Note that a signal corresponding to the imaginary component jXQ in the demodulation digital signal processing section 900 is set as the imaginary component XQ in the demodulation digital signal processing section 700.

In FIG. 4 and FIG. 5, impulse responses other than impulse response $h_1$ or $h_5$, such as impulse responses $h_2$ and $h_6$, are omitted because they are different only in the input signal and the tap number.

Figure 6:
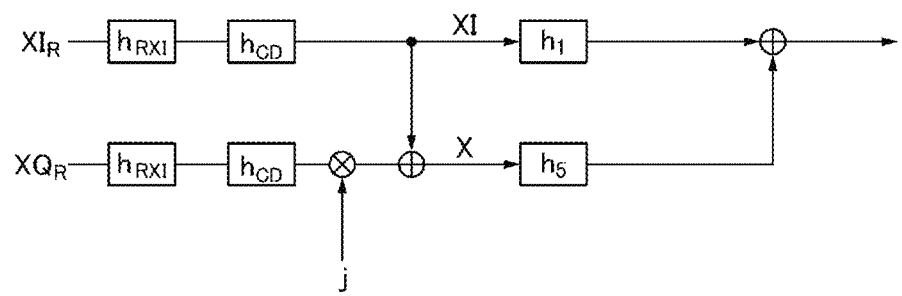
FIG. 6 is a diagram showing part of signal processing performed by a demodulation digital signal processing section of the first embodiment.
Figure 7:
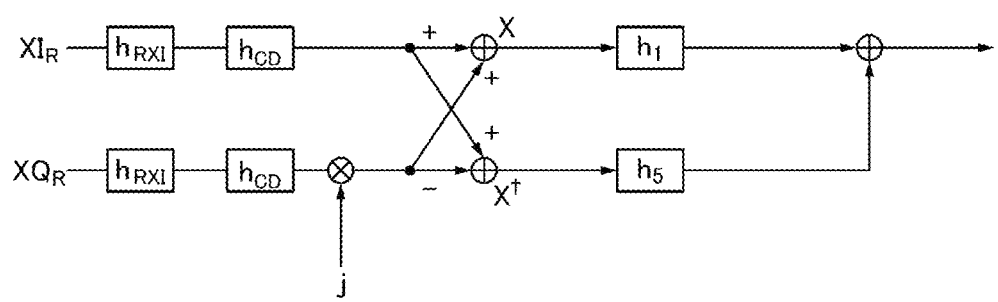
FIG. 7 is a diagram showing part of signal processing performed by a demodulation digital signal processing section of the first embodiment.

The demodulation digital signal processing section 700 may perform the signal processing shown in FIG. 6 or FIG. 7 instead of the signal processing shown in FIG. 5. FIG. 6 and FIG. 7 are diagrams each showing part of signal processing performed by the demodulation digital signal processing section 700 of the present embodiment.

In FIG. 6, the demodulation digital signal processing section 700 generates a real component XI and an imaginary component jXQ similarly to the signal processing shown in FIG. 5. The demodulation digital signal processing section 700 branches the real component XI. The demodulation digital signal processing section 700 adds one of the branched real components XI and the imaginary component jXQ to generate a complex signal X of the X-polarized wave. The demodulation digital signal processing section 700 adds the real component XI convolved with impulse response $h_1$ and the complex signal X convolved with impulse response $h_5$. That is, the demodulation digital signal processing section 700 generates a signal of $h_1*XI+h_5*(XI+jXQ)=(h_1+h_5)XI+jh_5XQ$. Processing equivalent to that of the demodulation digital signal processing section 900 can be performed by setting $h_1$ of the demodulation digital signal processing section 700 to $h_1+h_5$ in the demodulation digital signal processing section 900 and setting $h_5$ of the demodulation digital signal processing section 700 to $jh_5$ in the demodulation digital signal processing section 900.

In FIG. 7, the demodulation digital signal processing section 700 generates a real component XI and an imaginary component jXQ similarly to the signal processing shown in FIG. 5. The demodulation digital signal processing section 700 branches each of the real component XI and the imaginary component jXQ. The demodulation digital signal processing section 700 adds a real component XI and an imaginary component jXQ to generate a complex signal X of the X-polarized wave. Further, the demodulation digital signal processing section 700 subtracts an imaginary component jXQ from a real component XI to generate a complex conjugate $X^\dagger$ of the complex signal X. The demodulation digital signal processing section 700 adds the complex signal X convolved with impulse response $h_1$ and the complex conjugate $X^\dagger$ convolved with impulse response $h_5$. That is, the demodulation digital signal processing section 700 generates a signal of $h_1*(XI+jXQ)+h_5*(XI-jXQ)=(h_1+h_5)XI-j(h_1-h_5)XQ$. Processing equivalent to that of the demodulation digital signal processing section 900 can be performed by setting $h_1$ of the demodulation digital signal processing section 700 to $h_1+h_5$ in the demodulation digital signal processing section 900 and setting $h_5$ of the demodulation digital signal processing section 700 to $j(h_1-h_5)$ in the demodulation digital signal processing section 900.

Figure 8:
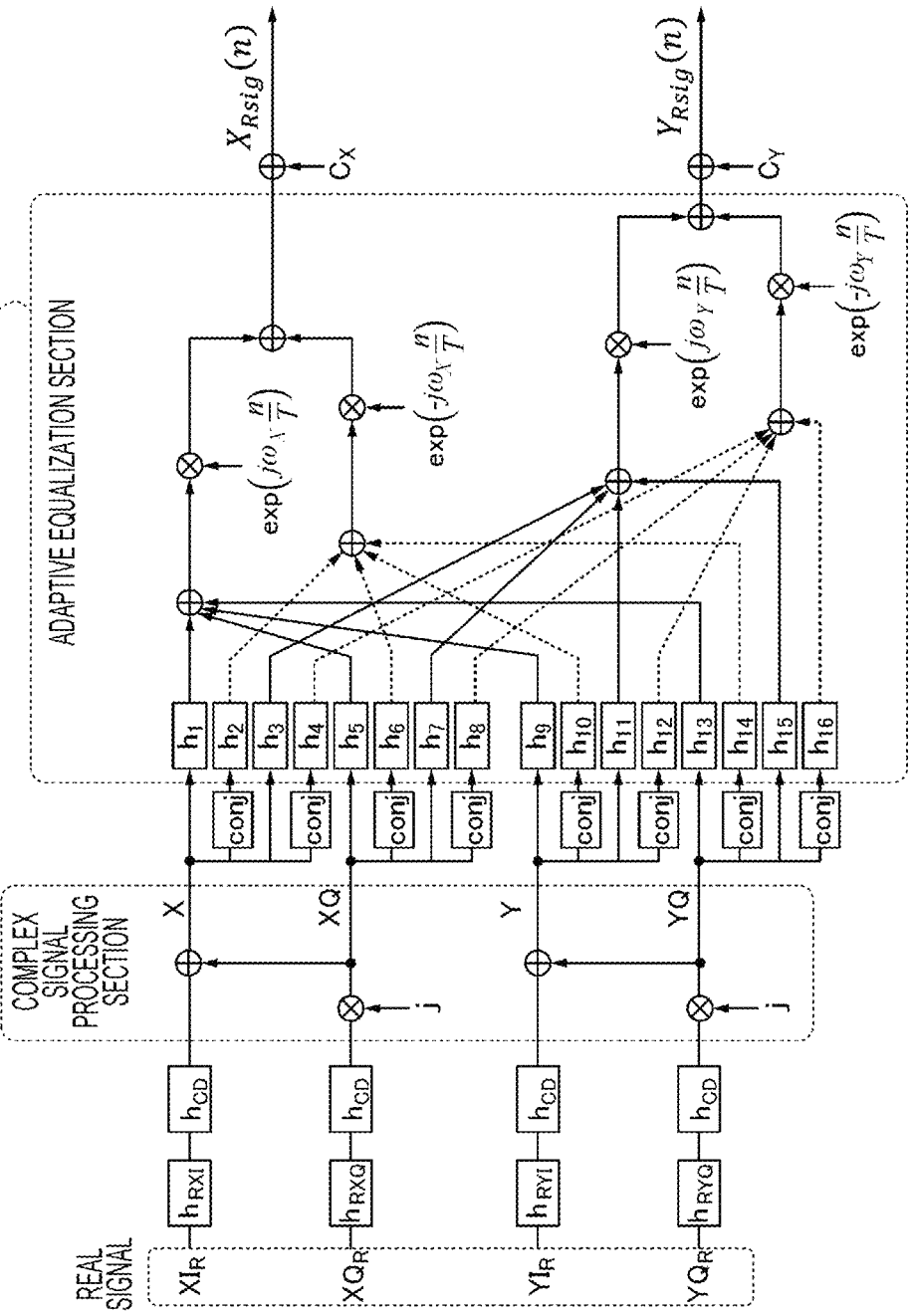
FIG. 8 is a diagram showing a configuration of a demodulation digital signal processing section of the first embodiment.

FIG. 8 is a diagram showing a configuration of a demodulation digital signal processing section 710 of the present embodiment. The demodulation digital signal processing section 710 is used as the demodulation digital signal processing section 700 in FIG. 1. The demodulation digital signal processing section 710 performs the signal processing shown in FIG. 5. The demodulation digital signal processing section 710 shown in FIG. 8 is a configuration in which a complex signal processing section 711 is added to the demodulation digital signal processing section 900 shown in FIG. 3. An adaptive equalization section 715 of the demodulation digital signal processing section 710 is the same configuration as the adaptive equalization section 905 of the demodulation digital signal processing section 900.

The demodulation digital signal processing section 710 generates a real component XI obtained by applying an impulse response $h_{RXI}$ and a complex impulse response $h_{CD}$ to a real component $XI_R$ of a reception complex signal $S_{X4}$ of an X-polarization component. Further, the demodulation digital signal processing section 710 applies an impulse response $h_{RXQ}$ and a complex impulse response $h_{CD}$ to an imaginary component $XQ_R$ of the reception complex signal $S_{X4}$ of the X-polarization component. The complex signal processing section 711 multiplies the imaginary component $XQ_R$ convolved with the impulse response $h_{RXQ}$ and the complex impulse response $h_{CD}$ by the imaginary unit j to generate an imaginary component XQ. The complex signal processing section 711 branches the imaginary component XQ into two. The complex signal processing section 711 adds the real component XI and one of the branched imaginary components XQ to generate a complex signal X of the X-polarized wave. The complex signal processing section 711 outputs the complex signal X and the imaginary component XQ that has not been used for addition.

Further, the demodulation digital signal processing section 710 generates a real component YI obtained by applying an impulse response $h_{RYI}$ and a complex impulse response $h_{CD}$ to a real component $YI_R$ of a reception complex signal $S_{Y4}$ of a Y-polarization component. The demodulation digital signal processing section 710 applies an impulse response $h_{RYQ}$ and a complex impulse response $h_{CD}$ to an imaginary component $YQ_R$ of the reception complex signal $S_{Y4}$ of the Y-polarization component. The complex signal processing section 711 multiplies the imaginary component $YQ_R$ convolved with the impulse response $h_{RYQ}$ and the complex impulse response $h_{CD}$ by the imaginary unit j to generate an imaginary component YQ. The complex signal processing section 711 branches the imaginary component YQ into two. The complex signal processing section 711 adds the real component YI and one of the branched imaginary components YQ to generate a complex signal Y of the Y-polarized wave. The complex signal processing section 711 outputs the complex signal Y and the imaginary component YQ that has not been used for addition.

The demodulation digital signal processing section 710 performs similar processing to that of the demodulation digital signal processing section 900 except for the following points. That is, the demodulation digital signal processing section 710 uses the complex signal X, the imaginary component XQ, the complex signal Y, and the imaginary component YQ outputted by the complex signal processing section 711 instead of the real component XI, the imaginary component XQ, the real component YI, and the imaginary component YQ in the demodulation digital signal processing section 900.

Specifically, the demodulation digital signal processing section 710 branches each of the complex signal X, the imaginary component XQ, the complex signal Y, and the imaginary component YQ outputted by the complex signal processing section 711 into four. The demodulation digital signal processing section 710 inputs, to the adaptive equalization section 715, two of the branched four signals of each of the complex signal X, the imaginary component XQ, the complex signal Y, and the imaginary component YQ as they are, and converts the other two signals into phase conjugate signals and inputs the phase conjugate signals to the adaptive equalization section 715. The phase conjugates of the complex signal X, the imaginary component XQ, the complex signal Y, and the imaginary component YQ are referred to as a complex signal phase conjugate X*, an imaginary component phase conjugate XQ*, a complex signal phase conjugate Y*, and an imaginary component phase conjugate YQ*, respectively.

The adaptive equalization section 715 adds a complex signal X convolved with impulse response $h_1$, an imaginary component XQ convolved with impulse response $h_5$, a complex signal Y convolved with impulse response $h_9$, and an imaginary component YQ convolved with impulse response $h_{13}$, and then applies a frequency offset $\exp(j\omega_x(n/T))$. n represents the symbol interval, and T represents the period of the symbol. Further, the adaptive equalization section 715 adds a complex signal phase conjugate X* convolved with impulse response $h_2$, an imaginary component phase conjugate XQ* convolved with impulse response $h_6$, a complex signal phase conjugate Y* convolved with impulse response $h_{10}$, and an imaginary component phase conjugate YQ* convolved with impulse response $h_{14}$, and then applies a frequency offset $\exp(-j\omega_x(n/T))$. The adaptive equalization section 715 adds the addition signal to which the frequency offset $\exp(j\omega_x(n/T))$ is applied and the addition signal to which the frequency offset $\exp(-j\omega_x(n/T))$ is applied, and thereby generates a reception signal of the X-polarization component. The adaptive equalization section 715 adds (or subtracts) a transmission data bias correction signal $C_X$ for canceling the bias deviation of the X-polarization component to (or from) the generated reception signal of the X-polarization component, and thereby obtains a reception signal $X_{Rsig}(n)$ of the X-polarization component subjected to distortion correction. The demapping section 536 outputs a reception signal $X^{\wedge}_{Rsig}(n)$ obtained as a result of performing symbol determination on the reception signal $X_{Rsig}(n)$.

Further, the adaptive equalization section 715 adds a complex signal X convolved with impulse response $h_3$, an imaginary component XQ convolved with impulse response $h_7$, a complex signal Y convolved with impulse response $h_{11}$, and an imaginary component YQ convolved with impulse response $h_{15}$, and then applies a frequency offset $\exp(j\omega_y(n/T))$. Further, the adaptive equalization section 715 adds a complex signal phase conjugate X* convolved with impulse response $h_4$, an imaginary component phase conjugate XQ* convolved with impulse response $h_8$, a complex signal phase conjugate Y* convolved with impulse response $h_{12}$, and an imaginary component phase conjugate YQ* convolved with impulse response $h_{16}$, and then applies a frequency offset $\exp(-j\omega_y(n/T))$. The adaptive equalization section 715 adds the addition signal to which the frequency offset $\exp(j\omega_y(n/T))$ is applied and the addition signal to which the frequency offset $\exp(-j\omega_y(n/T))$ is applied, and thereby generates a reception signal of the Y-polarization component. The adaptive equalization section 715 adds (or subtracts) a transmission data bias correction signal $C_Y$ for canceling the bias deviation of the Y-polarization component to (or from) the generated reception signal of the Y-polarization component, and thereby generates a reception signal $Y_{Rsig}(n)$ of the Y-polarization component subjected to distortion correction. The demapping section 536 outputs a reception signal $Y^{\wedge}_{Rsig}(n)$ obtained as a result of performing symbol determination on the reception signal $Y_{Rsig}(n)$.

The complex impulse response $h_{CD}$ for wavelength dispersion compensation, the impulse responses $h_1$ to $h_{16}$, and the frequency offsets $\exp(j\omega_x n/T)$, $\exp(-j\omega_x n/T)$, $\exp(j\omega_y n/$ T), and $\exp(-j\omega_y n/T)$ are adaptively and dynamically changed. The receiver 50 acquires these values by an arbitrary method.

The convolution of the impulse responses $h_{RXI}$, $h_{RXQ}$, $h_{RYI}$, and $h_{RYQ}$ corresponds to processing of the front-end correction section 532 shown in FIG. 1, and the processing of convolution of the complex impulse response $h_{CD}$ for wavelength dispersion compensation and the processing of the complex signal processing section 711 correspond to processing of the wavelength dispersion compensation section 533. The processing of the adaptive equalization section 715 corresponds to processing of the adaptive equalization section 534. The addition (or subtraction) of the transmission data bias correction signals $C_X$ and $C_Y$ corresponds to a function of the frequency-and-phase offset compensation section 535.

Depending on the configuration of the demodulation digital signal processing section 710, when there is no imperfection of the transceiver device, main taps having tap coefficients of impulse responses $h_1$, $h_3$, $h_9$, and $h_{11}$ are equivalent. That is, a compensation effect of the demodulation digital signal processing section 900 can be obtained as an extension of the demodulation digital signal processing section 800.

Further, when there is no imperfection in the transceiver device, all the taps other than the main taps are zero in principle. Thus, the initial values of the impulse responses excluding impulse responses $h_1$, $h_3$, $h_9$, and $h_{11}$ among impulse responses $h_1$ to $h_{16}$ are set to 0. Thereby, erroneous convergence can be prevented. Further, the convergence speed and the following speed can be increased by using main taps obtained in the demodulation digital signal processing section 800 as the initial values of impulse responses $h_1$, $h_3$, $h_9$, and $h_{11}$ of the demodulation digital signal processing section 710.

In the present embodiment, when the transceiver device has little imperfection, the value range (fixed-point implementation) of bits other than the main taps can be reduced at the time of hardware implementation, and therefore the circuit scale can be reduced. Further, the number of zero coefficients among the coefficients of auxiliary taps, which are the tap coefficients of impulse responses $h_2$, $h_4$, $h_5$, $h_6$, $h_7$, $h_8$, $h_{10}$, $h_{12}$, $h_{13}$, $h_{14}$, $h_{15}$, and $h_{16}$, may be increased using L0 regularization or the like. Thereby, the circuit operating rate is reduced without lowering the compensation characteristics, and therefore power reduction is enabled.

Figure 9:
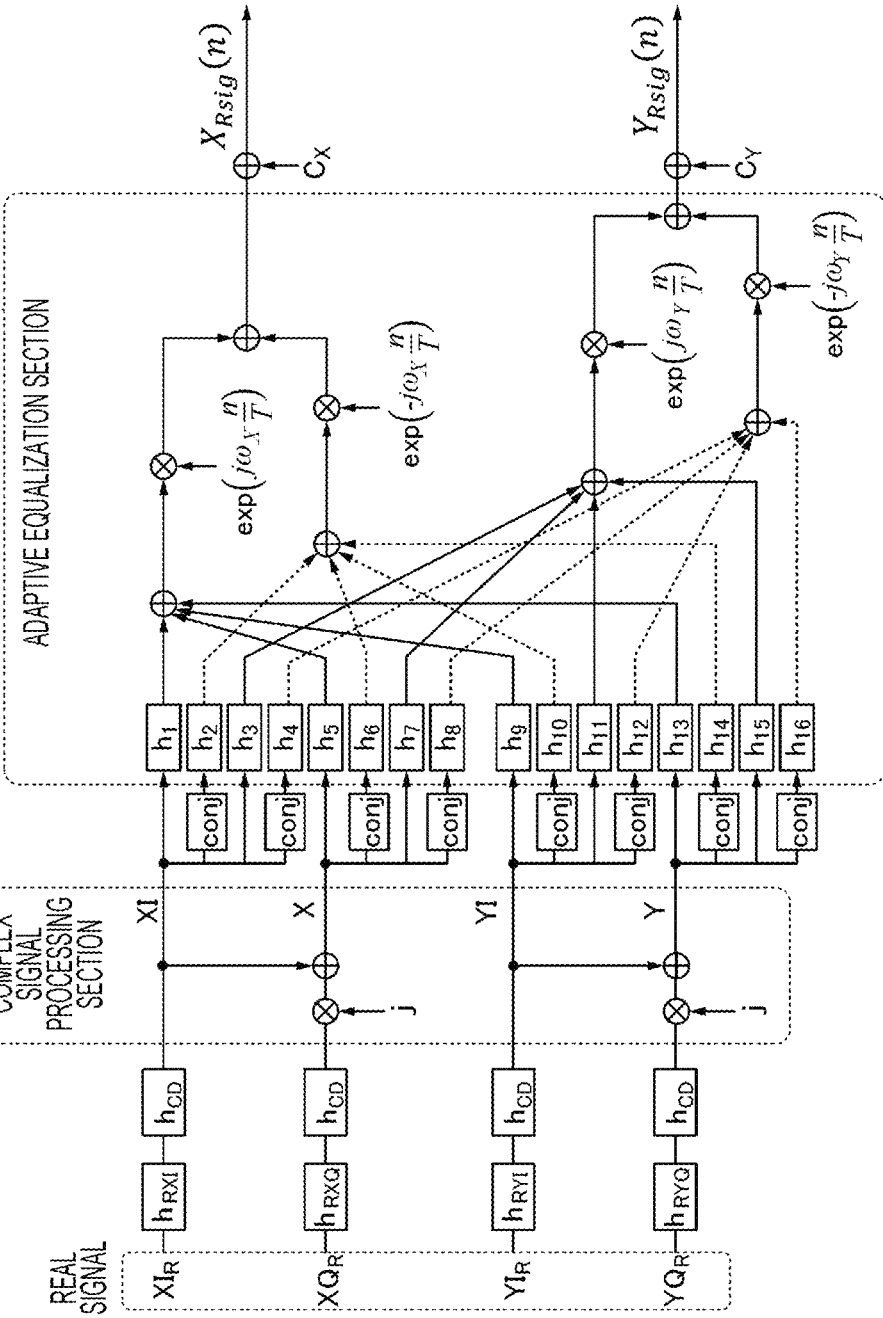
FIG. 9 is a diagram showing a configuration of a demodulation digital signal processing section of the first embodiment.
Figure 10:
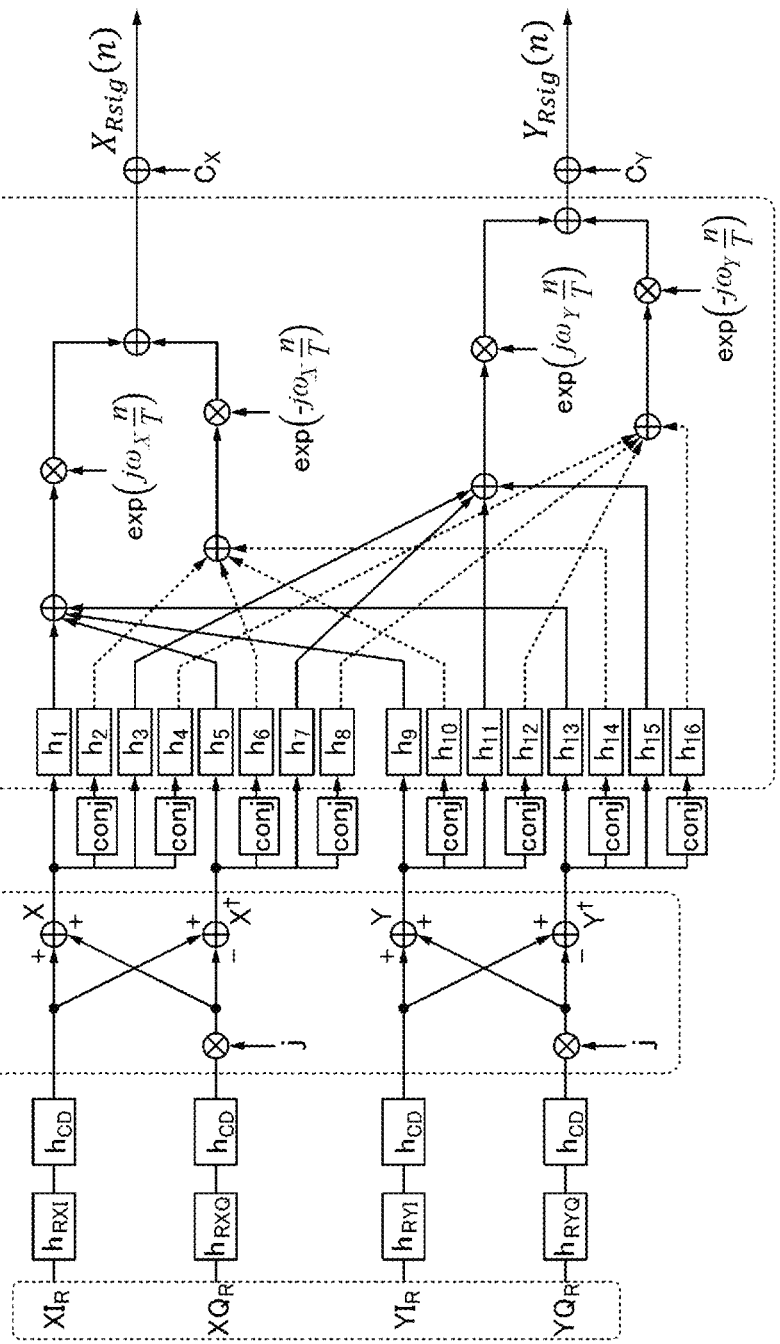
FIG. 10 is a diagram showing a configuration of a demodulation digital signal processing section of the first embodiment.

The receiver 50 may use, as the demodulation digital signal processing section 700, a demodulation digital signal processing section 720 shown in FIG. 9 or a demodulation digital signal processing section 730 shown in FIG. 10.

FIG. 9 is a diagram showing a configuration of a demodulation digital signal processing section 720. In FIG. 9, the same portions as those of the demodulation digital signal processing section 710 shown in FIG. 8 are denoted by the same reference numerals; and a description thereof is omitted. The demodulation digital signal processing section 720 is different from the demodulation digital signal processing section 710 shown in FIG. 8 in that a complex signal processing section 721 is provided in place of the complex signal processing section 711. The complex signal processing section 721 performs the signal processing shown in FIG. 6.

The complex signal processing section 721 receives a real component XI of an X-polarized wave generated by similar processing to that of the demodulation digital signal processing section 710. The complex signal processing section 721 branches the real component XI into two. Further, the complex signal processing section 721 generates an imaginary component XQ of the X-polarized wave by similar processing to that of the complex signal processing section 711. The complex signal processing section 721 adds one of the branched real components XI and the imaginary component XQ to generate a complex signal X of the X-polarized wave. The complex signal processing section 721 outputs the real component XI that has not been used for addition and the complex signal X.

Further, the complex signal processing section 721 receives a real component YI of a Y-polarized wave generated by similar processing to that of the demodulation digital signal processing section 710. The complex signal processing section 721 branches the real component YI into two. Further, the complex signal processing section 721 generates an imaginary component YQ of the Y-polarized wave by similar processing to that of the complex signal processing section 711. The complex signal processing section 721 adds one of the branched real components YI and the imaginary component YQ to generate a complex signal Y of the Y-polarized wave. The complex signal processing section 721 outputs the real component YI that has not been used for addition and the complex signal Y.

The demodulation digital signal processing section 720 performs similar processing to that of the demodulation digital signal processing section 710 except for the following points. That is, the demodulation digital signal processing section 720 uses the real component XI, the complex signal X, the real component YI, and the complex signal Y outputted by the complex signal processing section 721 instead of the complex signal X, the imaginary component XQ, the complex signal Y, and the imaginary component YQ outputted by the complex signal processing section 711.

FIG. 10 is a diagram showing a configuration of a demodulation digital signal processing section 730. In FIG. 10, the same portions as those of the demodulation digital signal processing section 710 shown in FIG. 8 are denoted by the same reference numerals; and a description thereof is omitted. The demodulation digital signal processing section 730 is different from the demodulation digital signal processing section 710 shown in FIG. 8 in that a complex signal processing section 731 is provided in place of the complex signal processing section 711. The complex signal processing section 731 performs the signal processing shown in FIG. 7.

The complex signal processing section 731 generates a real component XI and an imaginary component XQ by similar processing to that of the complex signal processing section 711, and branches each component into two. The complex signal processing section 731 adds one of the branched real components XI and one of the branched imaginary components XQ to calculate a complex signal X of the X-polarized wave. Further, the complex signal processing section 731 subtracts the other of the branched imaginary components XQ from the other of the branched real components XI, and thereby generates a complex conjugate $X^\dagger$ of the complex signal X. The complex signal processing section 731 outputs the complex signal X and the complex conjugate $X^\dagger$.

Further, the complex signal processing section 731 generates a real component YI and an imaginary component YQ by similar processing to that of the complex signal processing section 711, and branches each component into two. The complex signal processing section 731 adds one of the branched real components YI and one of the branched imaginary components YQ to calculate a complex signal Y of the Y-polarized wave. Further, the complex signal processing section 731 subtracts the other of the branched imaginary components YQ from the other of the branched real components YI, and thereby generates a complex conjugate $Y^\dagger$ of the complex signal Y. The complex signal processing section 731 outputs the complex signal Y and the complex conjugate $Y^\dagger$.

The demodulation digital signal processing section 730 performs similar processing to that of the demodulation digital signal processing section 710 except for the following points. That is, the demodulation digital signal processing section 730 uses the complex signal X, the complex conjugate $X^\dagger$ of the complex signal X, the complex signal Y, and the complex conjugate $Y^\dagger$ of the complex signal Y outputted by the complex signal processing section 731 instead of the complex signal X, the imaginary component XQ, the complex signal Y, and the imaginary component YQ outputted by the complex signal processing section 711.

Figure 11A:
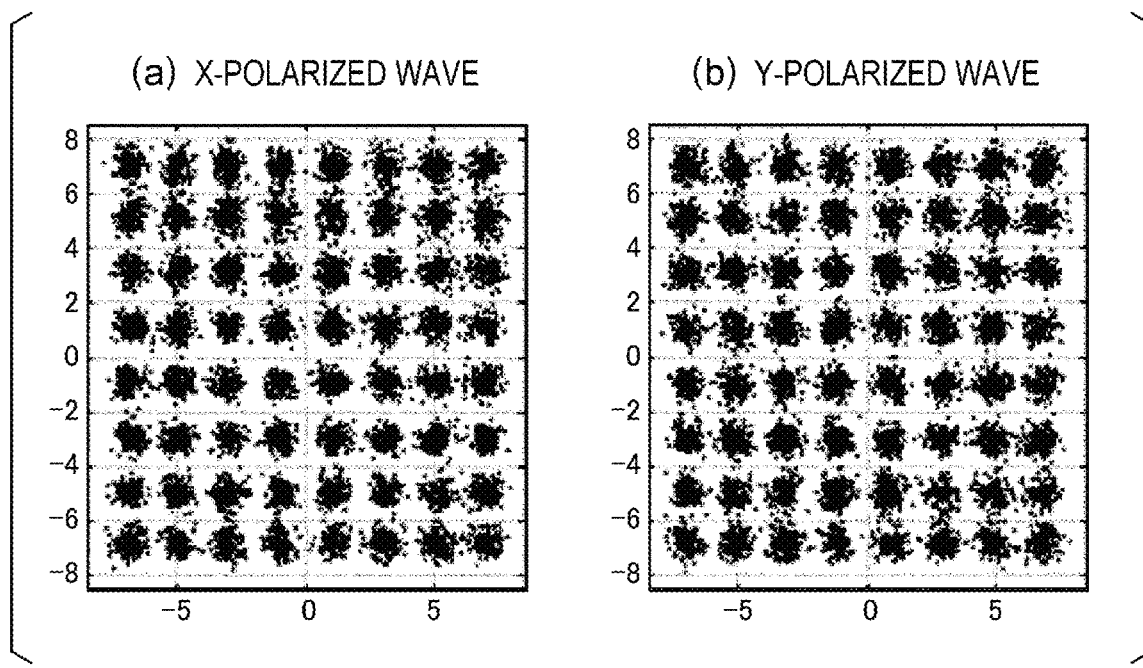
FIG. 11A is a diagram showing experimental results of a receiver of a conventional technology.
Figure 11B:
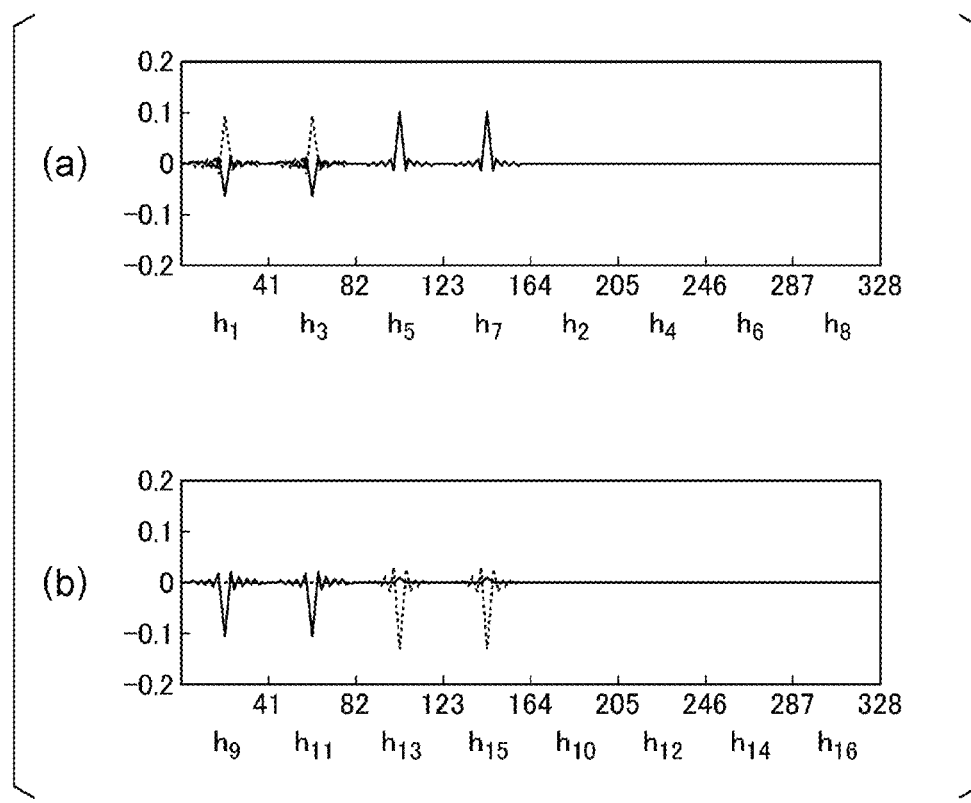
FIG. 11B is a diagram showing experimental results of the receiver of a conventional technology.
Figure 12A:
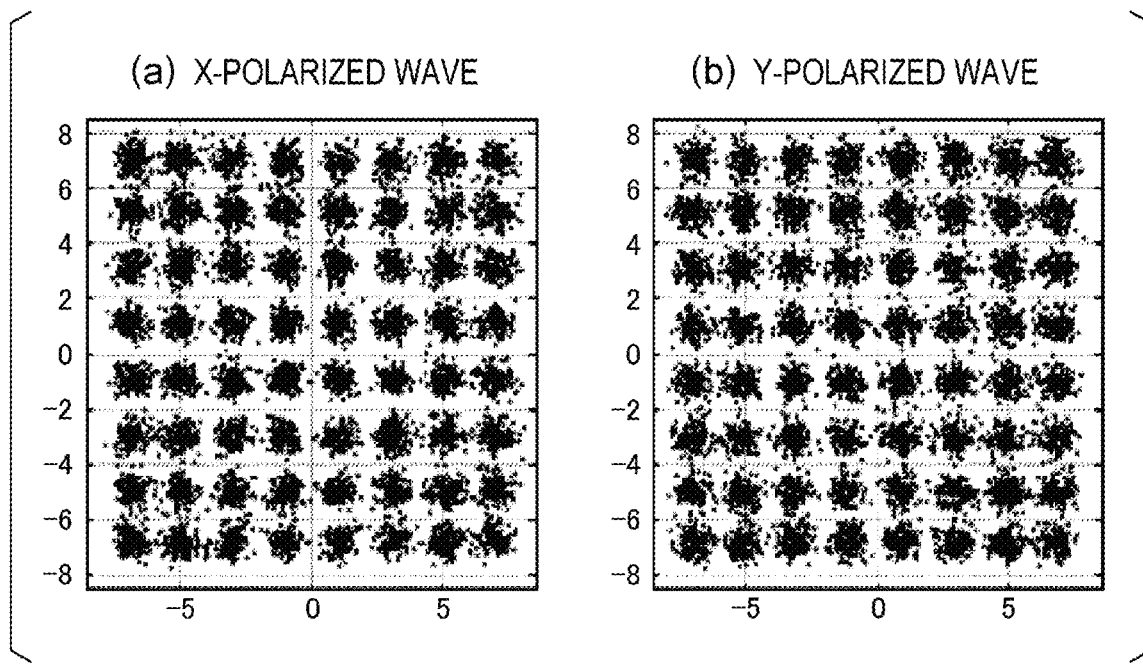
FIG. 12A is a diagram showing experimental results of a receiver of the first embodiment.
Figure 12B:
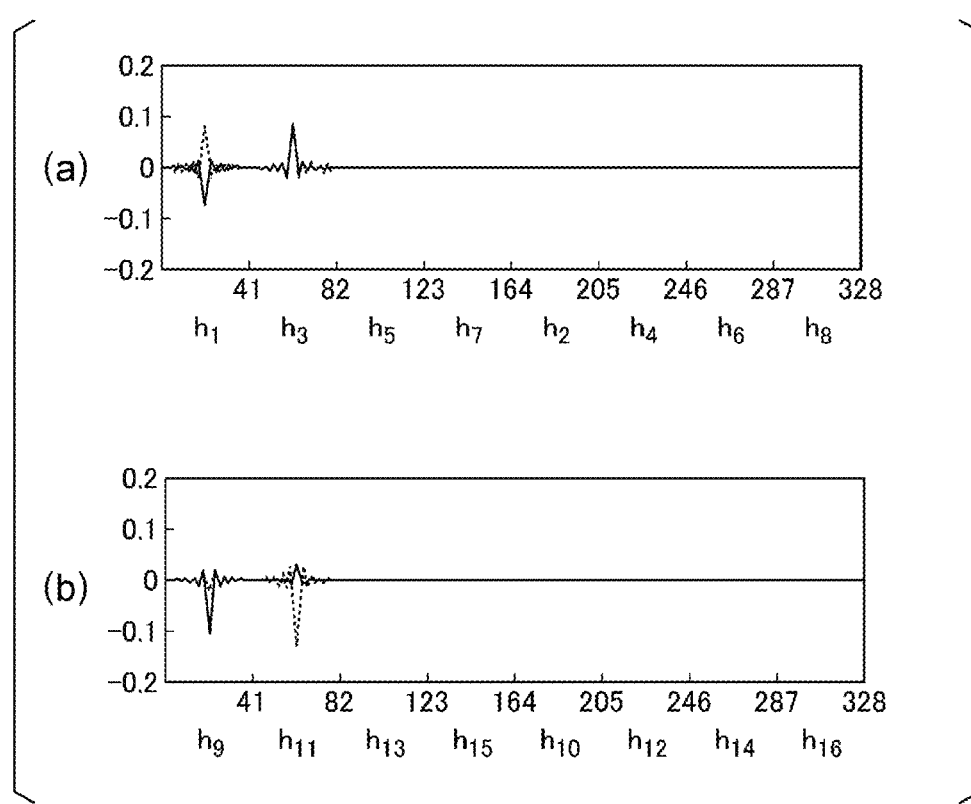
FIG. 12B is a diagram showing experimental results of the receiver of the first embodiment.

Next, experimental results regarding the quality of adaptive equalization processing are described. A reception signal of polarization multiplexing 64 QAM (quadrature amplitude modulation) at a modulation rate of 64 Gbaud was demodulated by each of receiver B of a conventional technology and the receiver 50 of the present embodiment. FIG. 11A and FIG. 11B are diagrams showing experimental results using receiver B, and FIG. 12A and FIG. 12B are diagrams showing experimental results using the receiver 50. FIG. 11A and FIG. 12A show constellations after demodulation of an X-polarized wave and a Y-polarized wave. FIG. 11B(a) and FIG. 12B(a) show the tap coefficients of impulse responses $h_1$ to $h_8$ at the time of demodulation, and FIG. 11B(b) and FIG. 12B(b) show the tap coefficients of impulse responses $h_9$ to $h_{16}$ at the time of demodulation. In FIG. 11B and FIG. 12B, the solid line indicates the real part of the tap, and the broken line indicates the imaginary part of the tap. As shown in these drawings, it can be seen that the receiver 50 of the present embodiment, while having an accuracy almost equal to that of receiver B using a conventional technology, effectively reduces the number of necessary taps compared to receiver B.

Second Embodiment

In the first embodiment, single carrier demodulation is performed. A receiver of the present embodiment performs subcarrier demodulation.

Figure 13:
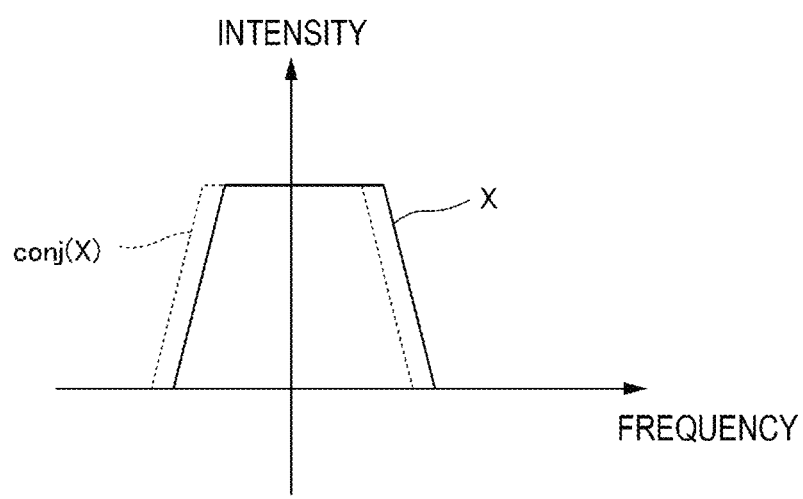
FIG. 13 is a diagram showing spectra of signals inputted to an adaptive equalization section of the first embodiment.

FIG. 13 is a diagram showing spectra of signals inputted to the adaptive equalization section 715 of the demodulation digital signal processing section 710 of the first embodiment. FIG. 13 shows a spectrum of a complex signal X to be convolved with impulse response $h_1$ and a spectrum of the phase conjugate conj(X) of the complex signal X to be convolved with impulse response $h_2$. When the complex conjugate of a time-domain signal is taken, the complex conjugate is line-symmetric with respect to the complex signal across DC (the center carrier) on the frequency axis, and each frequency component of the complex conjugate has a complex conjugate relationship with each frequency component of the complex signal.

Figure 14:
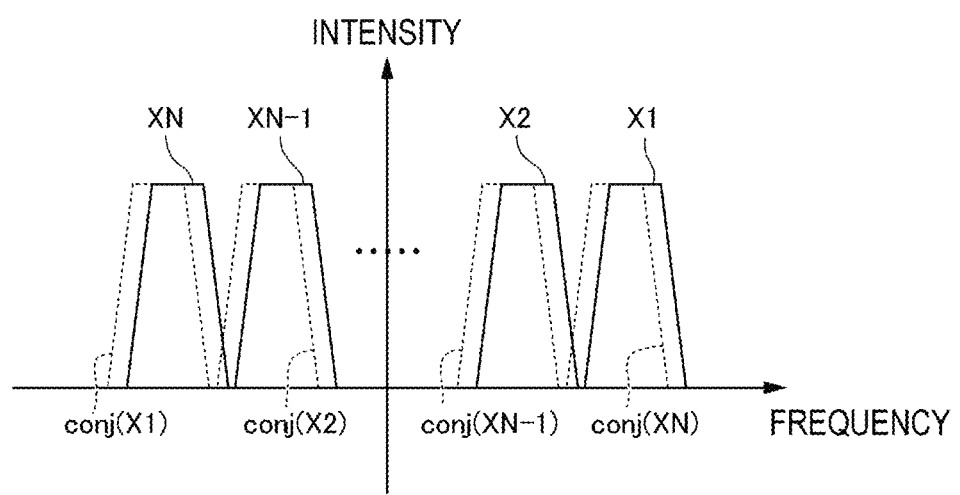
FIG. 14 is a diagram showing spectra of subcarrier signals of a second embodiment.

FIG. 14 is a diagram showing spectra of subcarrier signals used for the present embodiment. FIG. 14 shows spectra of N subcarrier signals X1 to XN orthogonal to each other and spectra of the phase conjugates conj(X1) to conj(XN) of the subcarrier signals X1 to XN. From a relationship between the spectra of a single carrier shown in FIG. 13 and the spectra of subcarrier signals shown in FIG. 14, it can be seen that the receiver of the first embodiment can be extended to demodulation of subcarrier signals by inputting, to the adaptive equalization section, subcarriers symmetric across DC.

When a similar relationship to that in FIG. 13 is considered with subcarrier signals, information of the complex conjugates of subcarrier signals symmetric across DC in the receiver is needed. More generally, the demodulation digital signal processing section of the present embodiment inputs, to a MIMO adaptive equalization circuit, a frequency domain line-symmetric across DC with respect to a frequency domain corresponding to a subcarrier signal Xk of interest (k is an integer of 1 or more and N or less), that is, a frequency domain of subcarrier (N−k+1). Subcarrier (N−k+1) is a symmetric subcarrier of subcarrier k. At this time, it does not matter whether or not there is a subcarrier in a frequency domain line-symmetric across DC.

The demodulation digital signal processing section of the present embodiment subjects each subcarrier to filtering processing, and then performs frequency conversion. At this time, the demodulation digital signal processing section may perform front-end compensation or dispersion compensation.

Figure 15:
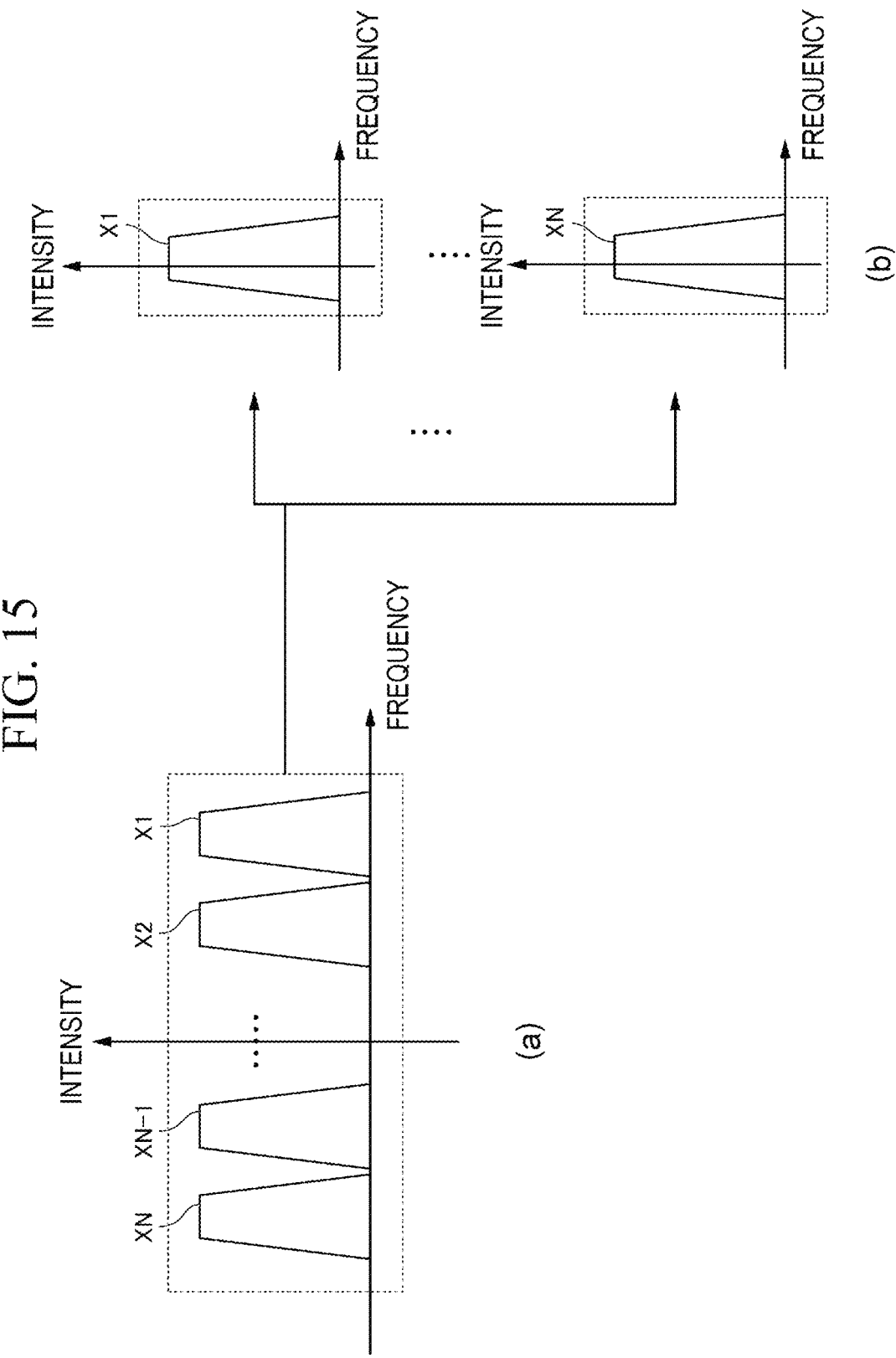
FIG. 15 is a diagram for describing subcarrier separation performed by a demodulation digital signal processing section of the second embodiment.

FIG. 15 is a diagram for describing subcarrier separation performed by a demodulation digital signal processing section of the present embodiment. FIG. 15(a) shows spectra of subcarrier signals X1 to XN. A subcarrier separation section 751 of a demodulation digital signal processing section 750 of the present embodiment shown in FIG. 16 described later independently separates each of a real component $XI_R$ and an imaginary component $XQ_R$ of a reception complex signal $S_{X4}$ of an X-polarized wave and a real component $YI_R$ and an imaginary component $YQ_R$ of a reception complex signal $S_{Y4}$ of a Y-polarized wave into subcarriers as shown in FIG. 15(b). The subcarrier separation section 751 performs similar processing to that of the complex signal processing section 711 on these signals separated into subcarriers, and thereby outputs a complex signal X, an imaginary component XQ, a complex signal Y, and an imaginary component YQ for each subcarrier. As another configuration, the subcarrier separation section 751 may convert a wide-band signal into a complex signal X and a complex signal Y, and an imaginary component XQ and an imaginary component YQ corresponding to them by similar processing to that of the complex signal processing section 711, and separate each of the converted complex signal X, complex signal Y, imaginary component XQ, and imaginary component YQ into subcarriers.

The subcarrier separation section 751 may, as shown in FIG. 15(b), separate subcarrier signals in the frequency domain. Further, the subcarrier separation section 751 may multiply a reception signal by exp(−jwt) in the time domain, then apply a low-pass filter, and down-sample each subcarrier. Here, w is the center frequency of the subcarrier signal. Further, the subcarrier separation section 751 may apply a bandbus filter to a reception signal in the time domain, then multiply the resulting signal by exp(−jwt), and down-sample each subcarrier.

The digital coherent optical transmission system of the present embodiment is a similar configuration to the digital coherent optical transmission system 1 of the first embodiment shown in FIG. 1. However, each transmission section 100 of the transmitter 10 generates subcarrier signals.

Figure 16:
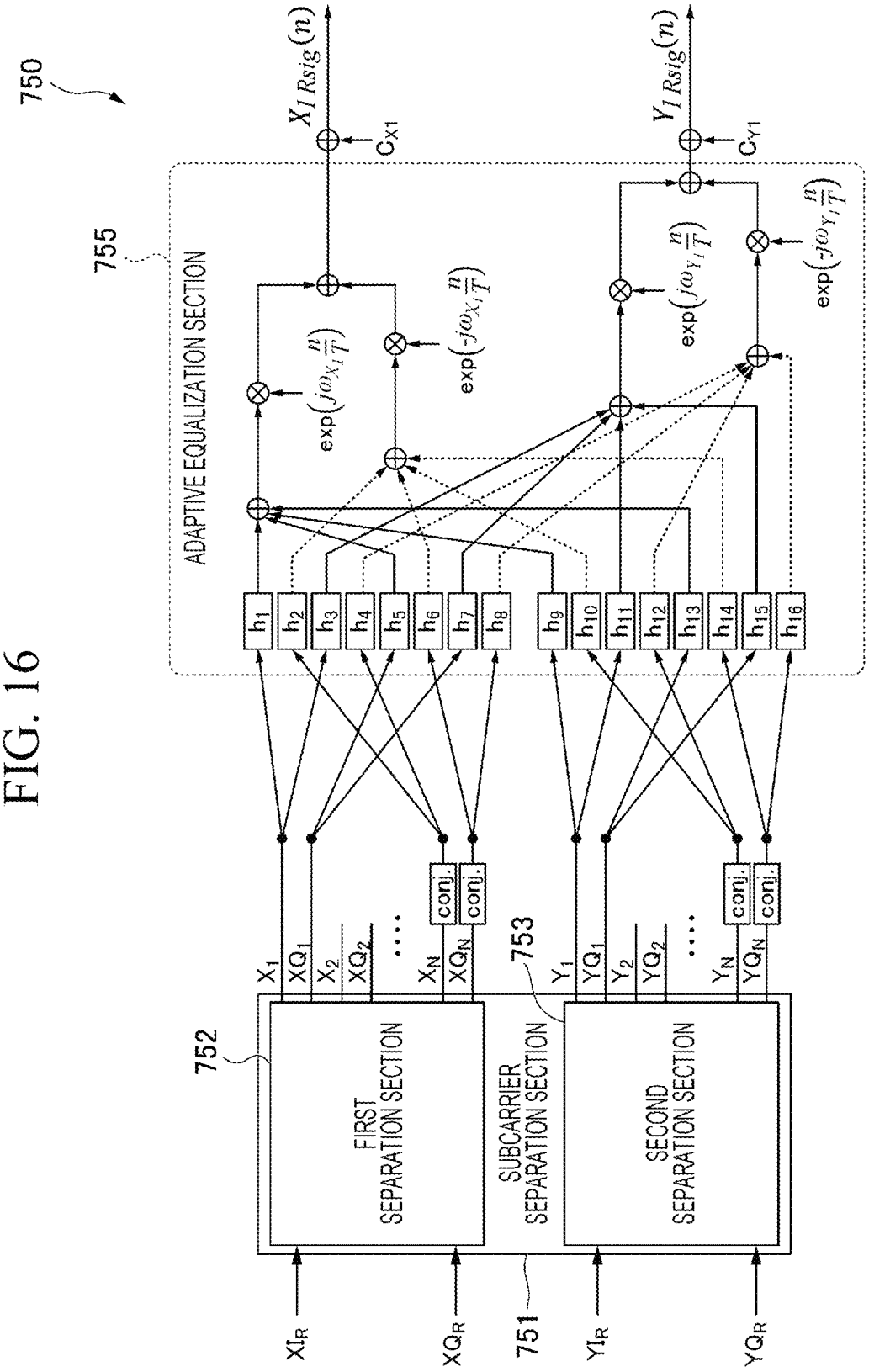
FIG. 16 is a diagram showing a configuration of a demodulation digital signal processing section of the second embodiment.

FIG. 16 is a diagram showing a configuration of a demodulation digital signal processing section 750 of the present embodiment. A receiver of the present embodiment includes the demodulation digital signal processing section 750 shown in FIG. 16 as the demodulation digital signal processing section 700 of the receiver 50 shown in FIG. 1. In FIG. 16, a configuration for outputting a signal of the k-th subcarrier is extracted and shown. FIG. 16 is an example in which k=1. The k-th subcarrier is referred to as subcarrier k. The demodulation digital signal processing section 750 includes a subcarrier separation section 751 and an adaptive equalization section 755. The subcarrier separation section 751 includes a first separation section 752 and a second separation section 753.

The demodulation digital signal processing section 750 receives a real component $XI_R$ and an imaginary component $XQ_R$ of a reception complex signal $S_{X4}$ of an X-polarized wave and a real component $YI_R$ and an imaginary component $YQ_R$ of a reception complex signal $S_{Y4}$ of a Y-polarized wave converted into digital signals by the ADCs 531-1 to 531-4. The first separation section 752 separates the real component $XI_R$ and the imaginary component $XQ_R$ of the reception complex signal $S_{X4}$ into subcarriers, performs similar processing to that of the complex signal processing section 711 shown in FIG. 8 for each subcarrier, and thereby outputs a complex signal X and an imaginary component XQ. The complex signal X and the imaginary component XQ of subcarrier k are referred to as a complex signal $X_k$ and an imaginary component $XQ_k$, respectively. The second separation section 753 separates the real component $YI_R$ and the imaginary component $YQ_R$ of the reception complex signal $S_{Y4}$ into subcarriers, performs similar processing to that of the complex signal processing section 711 shown in FIG. 8 for each subcarrier, and thereby outputs a complex signal Y and an imaginary component YQ. The complex signal Y and the imaginary component YQ of subcarrier k are referred to as a complex signal $Y_k$ and an imaginary component $YQ_k$, respectively.

The demodulation digital signal processing section 750 branches each of the complex signal $X_k$, the imaginary component $XQ_k$, the complex signal $X_{N-k+1}$, and the imaginary component $XQ_{N-K+1}$ outputted by the first separation section 752 and the complex signal $Y_k$, the imaginary component $YQ_k$, the complex signal $Y_{N-k+1}$, and the imaginary component $YQ_{N-k+1}$ outputted by the second separation section 753 into two. The demodulation digital signal processing section 750 inputs the branched two complex signals $X_k$, imaginary components $XQ_k$, complex signals $Y_k$, and imaginary components $YQ_k$ to the adaptive equalization section 755. Further, the demodulation digital signal processing section 750 converts each of the branched two complex signals $X_{N-k+1}$, imaginary components $XQ_{N-k+1}$, complex signals $Y_{N-k+1}$, and imaginary components $YQ_{N-k+1}$ into a phase conjugate signal, and inputs the phase conjugate signals to the adaptive equalization section 755. The phase conjugates of the complex signal $X_{N-k+1}$, the imaginary component $XQ_{N-k+1}$, the complex signal $Y_{N-k+1}$, and the imaginary component $YQ_{N-k+1}$ are referred to as a complex signal phase conjugate $X^*_{N-k+1}$, an imaginary component phase conjugate $XQ^*_{N-k+1}$, a complex signal phase conjugate $Y^*_{N-k+1}$, and an imaginary component phase conjugate $YQ^*_{N-k+1}$, respectively.

The adaptive equalization section 755 adds a complex signal $X_k$ convolved with impulse response $h_1$, an imaginary component $XQ_k$ convolved with impulse response $h_5$, a complex signal $Y_k$ convolved with impulse response $h_9$, and an imaginary component $YQ_k$ convolved with impulse response $h_{13}$, and then applies a frequency offset $\exp(j\omega_{xk}(n/T))$. Further, the adaptive equalization section 755 adds a complex signal phase conjugate $X^*_{N-k+1}$ convolved with impulse response $h_2$, an imaginary component phase conjugate $XQ^*_{N-k+1}$ convolved with impulse response $h_6$, a complex signal phase conjugate $Y^*_{N-k+1}$ convolved with impulse response $h_{10}$, and an imaginary component phase conjugate $YQ^*_{N-k+1}$ convolved with impulse response $h_{14}$, and then applies a frequency offset $\exp(-j\omega_{xk}(n/T))$. The adaptive equalization section 755 adds the addition signal to which the frequency offset $\exp(j\omega_{xk}(n/T))$ is applied and the addition signal to which the frequency offset $\exp(-j\omega_{xk}(n/T))$ is applied, and thereby generates a reception signal of the X-polarization component of subcarrier k. The adaptive equalization section 755 adds (or subtracts) a transmission data bias correction signal $C_{Xk}$ for canceling the bias deviation of the X-polarization component to (or from) the reception signal of the X-polarization component of subcarrier k, and thereby generates a reception signal $X_{kRsig}(n)$ of the X-polarization component subjected to distortion correction. The demapping section 536 outputs a reception signal $X\char`\^_{kRsig}(n)$ of subcarrier k obtained as a result of performing symbol determination on the reception signal $X_{kRsig}(n)$.

The adaptive equalization section 755 adds a complex signal $X_k$ convolved with impulse response $h_3$, an imaginary component $XQ_k$ convolved with impulse response $h_7$, a complex signal $Y_k$ convolved with impulse response $h_{11}$, and an imaginary component $YQ_k$ convolved with impulse response $h_{15}$, and then applies a frequency offset $\exp(j\omega_{yk}(n/T))$. Further, the adaptive equalization section 755 adds a complex signal phase conjugate $X^*_{N-k+1}$ convolved with impulse response $h_4$, an imaginary component phase conjugate $XQ^*_{N-k+1}$ convolved with impulse response $h_8$, a complex signal phase conjugate $Y^*_{N-k+1}$ convolved with impulse response $h_{12}$, and an imaginary component phase conjugate $YQ^*_{N-k+1}$ convolved with impulse response $h_{16}$, and then applies a frequency offset $\exp(-j\omega_{yk}(n/T))$. The adaptive equalization section 755 adds the addition signal to which the frequency offset $\exp(j\omega_{yk}(n/T))$ is applied and the addition signal to which the frequency offset $\exp(-j\omega_{yk}(n/T))$ is applied, and thereby generates a reception signal of the Y-polarization component of subcarrier k. The adaptive equalization section 755 adds (or subtracts) a transmission data bias correction signal $C_{Yk}$ for canceling the bias deviation of the Y-polarization component to (or from) the reception signal of the Y-polarization component of subcarrier k, and thereby generates a reception signal $Y_{kRsig}(n)$ of the Y-polarization component subjected to distortion correction. The demapping section 536 outputs a reception signal $Y\char`\^_{kRsig}(n)$ of subcarrier k obtained as a result of performing symbol determination on the reception signal $Y_{kRsig}(n)$.

Although in the above the subcarrier separation section 751 performs, for each subcarrier of each polarized wave, similar processing to that of the complex signal processing section 711 shown in FIG. 8, the subcarrier separation section 751 may perform, for each subcarrier of each polarized wave, similar processing to that of the complex signal processing section 731 shown in FIG. 9. That is, the first separation section 752 separates a real component $XI_R$ and an imaginary component $XQ_R$ of a reception complex signal $S_{X4}$ into subcarriers, performs similar processing to that of the complex signal processing section 721 shown in FIG. 9 for each subcarrier, and thereby outputs a real component XI and a complex signal X. The real component XI and the complex signal X of subcarrier k are referred to as a real component $XI_k$ and a complex signal $X_k$, respectively. The second separation section 753 separates a real component $YI_R$ and an imaginary component $YQ_R$ of a reception complex signal $S_{Y4}$ into subcarriers, performs similar processing to that of the complex signal processing section 721 shown in FIG. 9 for each subcarrier, and thereby outputs a real component YI and a complex signal Y. The real component YI and the complex signal Y of subcarrier k are referred to as a real component $YI_k$ and a complex signal $Y_k$, respectively. The demodulation digital signal processing section 750 performs processing by using the real component $XI_k$, the complex signal $X_k$, the real component $YI_k$, and the complex signal $Y_k$ instead of the complex signal $X_k$, the imaginary component $XQ_k$, the complex signal $Y_k$, and the imaginary component $YQ_k$ outputted from the subcarrier separation section 751 shown in FIG. 16.

The subcarrier separation section 751 may perform similar processing to that of the complex signal processing section 731 shown in FIG. 10 for each subcarrier of each polarized wave. That is, the first separation section 752 separates a real component $XI_R$ and an imaginary component $XQ_R$ of a reception complex signal $S_{X4}$ into subcarriers, performs similar processing to that of the complex signal processing section 731 shown in FIG. 10 for each subcarrier, and thereby outputs a complex signal X and a complex conjugate $X^\dagger$ of the complex signal X. The complex signal X of subcarrier k and the complex conjugate $X^\dagger$ of the complex signal X of subcarrier k are referred to as a complex signal $X_k$ and a complex conjugate $X^\dagger_k$ of the complex signal $X_k$, respectively. The second separation section 753 separates a real component $YI_R$ and an imaginary component $YQ_R$ of a reception complex signal $S_{Y4}$ into subcarriers, performs similar processing to that of the complex signal processing section 731 shown in FIG. 10 for each subcarrier, and thereby outputs a complex signal Y and a complex conjugate $Y^\dagger$ of the complex signal Y. The complex signal Y of subcarrier k and the complex conjugate $Y^\dagger$ of the complex signal Y of subcarrier k are referred to as a complex signal $Y_k$ and a complex conjugate $Y^\dagger_k$ of the complex signal $Y_k$, respectively. The demodulation digital signal processing section 750 performs processing by using the complex signal $X_k$, the complex conjugate $X^\dagger_k$ of the complex signal $X_k$, the complex signal $Y_k$, and the complex conjugate $Y^\dagger_k$ of the complex signal $Y_k$ instead of the complex signal $X_k$, the imaginary component $XQ_k$, the complex signal $Y_k$, and the imaginary component $YQ_k$ outputted from the subcarrier separation section 751 shown in FIG. 16.

When N is an odd number, the demodulation digital signal processing section 750 processes the center subcarrier (N+1)/2 in a similar manner to the first embodiment. The subcarrier separation section 751 may perform one or both of front-end compensation and wavelength dispersion compensation. Front-end compensation is performed by applying an impulse response for compensating for frequency characteristics of the receiver 50 to each subcarrier of each polarized wave. Wavelength dispersion compensation is performed by applying an impulse response for wavelength dispersion compensation to each subcarrier of each polarized wave.

Next, experimental results regarding the quality of adaptive equalization processing are described. A reception signal of polarization multiplexing 64 QAM with eight subcarriers and at a modulation rate of 64 Gbaud was demodulated by each of receiver B of a conventional technology and the receiver 50 using the demodulation digital signal processing section 750 of the present embodiment. FIG. 17 is a diagram showing constellations after demodulation of an X-polarized wave and a Y-polarized wave of subcarriers by receiver B. FIG. 18 is a diagram showing constellations after demodulation of an X-polarized wave and a Y-polarized wave of subcarriers by the receiver 50 of the present embodiment. The numerical value written above each constellation indicates waveform consistency (SNR dB) in each polarized wave of each subcarrier. The average SNR of the conventional receiver B was 22.71 dB, and the average SNR of the receiver 50 of the present embodiment was 22.99 dB. It is found that the present embodiment exhibits clearer constellations, and it can be seen that also the average SNR is improved from the conventional technology.

According to the embodiment described above, a communication system includes a transmitter and a receiver. For example, the communication system corresponds to the digital coherent optical transmission system 1 of the embodiment, the transmitter corresponds to the transmitter 10 of the embodiment, and the receiver corresponds to the receiver 50 of the embodiment. A signal processing apparatus included in the receiver includes a first compensation section, a complex signal processing section, an input signal generation section, an equalization section, and a second compensation section. For example, the signal processing apparatus corresponds to any of the demodulation digital signal processing sections 700, 710, 720, and 730 of the embodiment, the first compensation section corresponds to the front-end correction section 532 and the wavelength dispersion compensation section 533 of the embodiment, the complex signal processing section corresponds to the wavelength dispersion compensation section 533 and any of the complex signal processing sections 711, 721, and 731 of the embodiment, the input signal generation section corresponds to the wavelength dispersion compensation section 533 of the embodiment, the equalization section corresponds to either of the adaptive equalization sections 534 and 715 of the embodiment, and the second compensation section corresponds to the frequency-and-phase offset compensation section 535 of the embodiment.

The first compensation section convolves an impulse response for compensating for frequency characteristics of the receiver and a complex impulse response for wavelength dispersion compensation with each of a real component and an imaginary component of each polarized wave of a polarization-multiplexed reception signal. For each polarized wave, the complex signal processing section performs imaginary unit multiplication processing of multiplying the imaginary component subjected to convolution by the imaginary unit, and then performs complex signal processing. The complex signal processing is any of processing of branching the imaginary component subjected to imaginary unit multiplication processing into two and adding one of the branched imaginary components to the real component subjected to convolution, processing of branching the real component subjected to convolution into two and adding one of the branched real components to the imaginary component subjected to imaginary unit multiplication processing, and processing of branching each of the real component subjected to convolution and the imaginary component subjected to imaginary unit multiplication processing into two, adding one of the branched imaginary components to one of the branched real components, and subtracting the other of the branched imaginary components from the other of the branched real components. For each polarized wave, the input signal generation section generates, as input signals, a real component and an imaginary component of each polarized wave after complex signal processing and the phase conjugates of the real component and the imaginary component of each polarized wave after complex signal processing. For each polarized wave, the equalization section generates a first addition signal obtained by a process in which each of the real component and the imaginary component of each polarized wave included in the input signals is multiplied by a complex impulse response, then the resulting components are added, and further a phase rotation for frequency offset compensation is applied and a second addition signal obtained by a process in which each of the phase conjugate of the real component and the phase conjugate of the imaginary component of each polarized wave included in the input signals is multiplied by a complex impulse response, then the resulting components are added, and further a phase rotation opposite to the phase rotation for frequency offset compensation is applied. For each polarized wave, the second compensation section adds or subtracts a transmission data bias correction signal to or from a signal obtained by adding the first addition signal and the second addition signal.

Further, a signal processing apparatus included in the receiver includes a subcarrier separation section, an input signal generation section, an equalization section, and a compensation section. For example, the signal processing apparatus corresponds to the demodulation digital signal processing section 750 of the embodiment, the subcarrier separation section corresponds to the subcarrier separation section 751 of the embodiment, the input signal generation section corresponds to the wavelength dispersion compensation section 533 of the embodiment, the equalization section corresponds to either of the adaptive equalization sections 534 and 755 of the embodiment, and the compensation section corresponds to the frequency-and-phase offset compensation section 535 of the embodiment.

The subcarrier separation section separates, for subcarriers, each of a real component and an imaginary component of each polarized wave of a polarization-multiplexed reception signal and, for each subcarrier of each polarized wave, performs imaginary unit multiplication processing of multiplying the imaginary component by the imaginary unit and then performs complex signal processing. The complex signal processing is processing of branching the imaginary component subjected to imaginary unit multiplication processing into two and adding one of the branched imaginary components to the real component, processing of branching the real component and adding one of the branched real components to the imaginary component subjected to imaginary unit multiplication processing, and processing of branching each of the real component subjected to convolution and the imaginary component multiplied by the imaginary unit, adding one of the branched imaginary components to one of the branched real components, and subtracting the other of the branched imaginary components from the other of the branched real components. For each subcarrier of each polarized wave, the input signal generation section generates, as input signals, a real component and an imaginary component of each polarized wave after complex signal processing of a subcarrier and the phase conjugates of the real component and the imaginary component of each polarized wave after complex signal processing of a symmetric subcarrier that is another subcarrier in a frequency domain symmetric to the frequency domain of the foregoing subcarrier across the center frequency of the reception signal. For each subcarrier of each polarized wave, the equalization section generates a first addition signal obtained by a process in which each of the real component and the imaginary component of each polarized wave of a subcarrier included in the input signals is multiplied by a complex impulse response, then the resulting components are added, and further a phase rotation for frequency offset compensation is applied and a second addition signal obtained by a process in which each of the phase conjugate of the real component and the phase conjugate of the imaginary component of each polarized wave of a symmetric subcarrier included in the input signals is multiplied by a complex impulse response, then the resulting components are added, and further a phase rotation opposite to the phase rotation for frequency offset compensation is applied. For each subcarrier of each polarized wave, the compensation section adds or subtracts a transmission data bias correction signal to or from a signal obtained by adding the first addition signal and the second addition signal.

The subcarrier separation section may further perform compensation of frequency characteristics of the receiver and wavelength dispersion compensation on each subcarrier of each polarized wave. For example, the subcarrier separation section may further perform, on each subcarrier of each polarized wave, processing of convolving an impulse response for compensating for frequency characteristics of the receiver and a complex impulse response for wavelength dispersion compensation.

For example, the receiver receives a polarization-multiplexed reception signal by means of an optical signal.

Hereinabove, embodiments of this invention are described in detail with reference to the drawings; however, specific configurations are not limited to these embodiments, and include designs, etc. without departing from the spirit of this invention.

| | Reference Signs List |
|---|---|
| 1 | digital coherent optical transmission system |
| 10 | transmitter |
| 20 | WDM multiplexer |
| 30 | optical fiber transmission line |
| 31 | optical amplifier |
| 40 | WDM demultiplexer |
| 50 | receiver |
| 100 | transmission section |
| 110 | digital signal processing section |
| 111 | encoding section |
| 112 | mapping section |
| 113 | training signal insertion section |
| 114 | sampling frequency change section |
| 115 | waveform shaping section |
| 116 | pre-equalization section |
| 117-1 to 117-4 | digital-to-analog converter |
| 120 | modulator driver |
| 121-1 to 121-4 | amplifier |
| 130 | light source |
| 140 | integration module |
| 141-1, 141-2 IQ | modulator |
| 142 | polarization synthesis section |
| 500 | reception section |
| 510 | local oscillation light source |
| 520 | optical front end |
| 521 | polarization separation section |
| 522-1, 522-2 | optical 90-degree hybrid coupler |
| 523-1 to 523-4 | BPD |
| 524-1 to 524-4 | amplifier |
| 530 | digital signal processing section |
| 531-1 to 531-4 | analog-to-digital converter |
| 532 | front-end correction section |
| 533 | wavelength dispersion compensation section |
| 534, 715, 755, 805, 905 | adaptive equalization section |
| 535 | frequency-and-phase offset compensation section |
| 536 | demapping section |
| 537 | decoding section |
| 700, 710, 720, 730, 750, 800, 900 | demodulation digital signal processing section |
| 711, 721, 731 | complex signal processing section |
| 751 | subcarrier separation section |
| 752 | first separation section |
| 753 | second separation section |

The invention claimed is:

1. A signal processing method comprising:
   convolving an impulse response for compensating for a frequency characteristic of a receiver and a complex impulse response for wavelength dispersion compensation with each of a real component and an imaginary component of each polarized wave of a polarization-multiplexed reception signal;
   for each polarized wave, performing imaginary unit multiplication processing of multiplying the imaginary component subjected to convolution by an imaginary unit and then performing complex signal processing that is any of (i) processing of branching the imaginary component multiplied by the imaginary unit and adding one of the branched imaginary components to the real component subjected to convolution, (ii) processing of branching the real component subjected to convolution and adding one of the branched real components to the imaginary component multiplied by the imaginary unit, and (iii) processing of branching each of the real component subjected to convolution and the imaginary component multiplied by the imaginary unit, adding one of the branched imaginary components to one of the branched real components, and subtracting another of the branched imaginary components from another of the branched real components;
   for each polarized wave, generating, as input signals, the real component and the imaginary component of each polarized wave after the complex signal processing and phase conjugates of the real component and the imaginary component of each polarized wave after the complex signal processing;
   for each polarized wave, generating a first addition signal obtained by a process in which each of the real component and the imaginary component of each polarized wave included in the input signals is multiplied by a complex impulse response, then resulting components are added, and further a phase rotation for frequency offset compensation is applied, and generating a second addition signal obtained by a process in which each of the phase conjugate of the real component and the phase conjugate of the imaginary component of each polarized wave included in the input signals is multiplied by a complex impulse response, then resulting components are added, and further a phase rotation opposite to the phase rotation for frequency offset compensation is applied; and
   for each polarized wave, adding or subtracting a transmission data bias correction signal to or from a signal obtained by adding the first addition signal and the second addition signal.

2. The signal processing method according to claim 1, wherein the reception signal is an optical signal.

3. A signal processing method comprising:
   separating, for subcarriers, each of a real component and an imaginary component of each polarized wave of a polarization-multiplexed reception signal and, for each subcarrier of each polarized wave, performing imaginary unit multiplication processing of multiplying the imaginary component by an imaginary unit and then performing complex signal processing that is any of (i) processing of branching the imaginary component multiplied by the imaginary unit and adding one of the branched imaginary components to the real component, (ii) processing of branching the real component and adding one of the branched real components to the imaginary component multiplied by the imaginary unit, and (iii) processing of branching each of the real component subjected to convolution and the imaginary component multiplied by the imaginary unit, adding one of the branched imaginary components to one of the branched real components, and subtracting another of the branched imaginary components from another of the branched real components;
   for each subcarrier of each polarized wave, generating, as input signals, the real component and the imaginary component of each polarized wave after the complex signal processing of the subcarrier and phase conjugates of the real component and the imaginary component of each polarized wave after the complex signal processing of a symmetric subcarrier that is another subcarrier in a frequency domain symmetric to a frequency domain of the foregoing subcarrier across a center frequency of the reception signal;
   for each subcarrier of each polarized wave, generating a first addition signal obtained by a process in which each of the real component and the imaginary component of each polarized wave of the subcarrier included in the input signals is multiplied by a complex impulse response, then resulting components are added, and further a phase rotation for frequency offset compensation is applied, and generating a second addition signal obtained by a process in which each of the phase conjugate of the real component and the phase conjugate of the imaginary component of each polarized wave of the symmetric subcarrier included in the input signals is multiplied by a complex impulse response, then resulting components are added, and further a phase rotation opposite to the phase rotation for frequency offset compensation is applied; and
   for each subcarrier of each polarized wave, adding or subtracting a transmission data bias correction signal to or from a signal obtained by adding the first addition signal and the second addition signal.

4. The signal processing method according to claim 2, wherein compensation of a frequency characteristic of a receiver and wavelength dispersion compensation are further performed on each subcarrier of each polarized wave.

5. The signal processing method according to claim 2, wherein the reception signal is an optical signal.

6. A signal processing apparatus comprising:
   a first compensator that convolves an impulse response for compensating for a frequency characteristic of a receiver and a complex impulse response for wavelength dispersion compensation with each of a real component and an imaginary component of each polarized wave of a polarization-multiplexed reception signal;
   a complex signal processor that, for each polarized wave, performs imaginary unit multiplication processing of multiplying the imaginary component subjected to convolution by an imaginary unit and then performs complex signal processing that is any of (i) processing of branching the imaginary component multiplied by the imaginary unit and adding one of the branched imaginary components to the real component subjected to convolution, (ii) processing of branching the real component subjected to convolution and adding one of the branched real components to the imaginary component multiplied by the imaginary unit, and (iii) processing of branching each of the real component subjected to convolution and the imaginary component multiplied by the imaginary unit, adding one of the branched imaginary components to one of the branched real components, and subtracting another of the branched imaginary components from another of the branched real components;

an input signal generator that, for each polarized wave, generates, as input signals, the real component and the imaginary component of each polarized wave after the complex signal processing and phase conjugates of the real component and the imaginary component of each polarized wave after the complex signal processing;

an equalizer that, for each polarized wave, generates a first addition signal obtained by a process in which each of the real component and the imaginary component of each polarized wave included in the input signals is multiplied by a complex impulse response, then resulting components are added, and further a phase rotation for frequency offset compensation is applied, and generates a second addition signal obtained by a process in which each of the phase conjugate of the real component and the phase conjugate of the imaginary component of each polarized wave included in the input signals is multiplied by a complex impulse response, then resulting components are added, and further a phase rotation opposite to the phase rotation for frequency offset compensation is applied; and a second compensator that, for each polarized wave, adds or subtracts a transmission data bias correction signal to or from a signal obtained by adding the first addition signal and the second addition signal.

\* \* \* \* \*